US008166567B2

(12) United States Patent
Phan et al.

(10) Patent No.: US 8,166,567 B2
(45) Date of Patent: Apr. 24, 2012

(54) FAST-SCANNING SPM SCANNER AND METHOD OF OPERATING SAME

(75) Inventors: Nghi Phan, Santa Barbara, CA (US);
Craig Cusworth, Redding, CA (US);
Craig Prater, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 553 days.

(21) Appl. No.: 11/687,304

(22) Filed: Mar. 16, 2007

(65) Prior Publication Data

US 2008/0223119 A1 Sep. 18, 2008

(51) Int. Cl.
*G01Q 10/00* (2010.01)
*G01Q 20/02* (2010.01)
*G01Q 60/24* (2010.01)

(52) U.S. Cl. .................................. 850/1; 850/6; 850/33

(58) Field of Classification Search .................. 850/1, 6, 850/33
See application file for complete search history.

(56) References Cited

U.S. PATENT DOCUMENTS

| | | | |
|---|---|---|---|
| 5,266,801 A | 11/1993 | Elings et al. | |
| RE34,489 E | 12/1993 | Hansma et al. | |
| 5,388,452 A | 2/1995 | Harp et al. | |
| 5,412,980 A | 5/1995 | Elings et al. | |
| 5,714,682 A | 2/1998 | Prater et al. | |
| 5,825,020 A * | 10/1998 | Hansma et al. | 250/216 |
| 6,297,502 B1 | 10/2001 | Jarvis et al. | |
| 6,677,567 B2 | 1/2004 | Hong et al. | |
| 6,945,100 B2 | 9/2005 | Kwon et al. | |
| 6,951,129 B2 | 10/2005 | Kwon et al. | |
| 7,013,717 B1 | 3/2006 | Struckmeier et al. | |
| 7,170,054 B2 | 1/2007 | Iyoki et al. | |
| 7,249,494 B2 | 7/2007 | Hwang et al. | |

(Continued)

FOREIGN PATENT DOCUMENTS

JP 08 122342 5/1996

(Continued)

OTHER PUBLICATIONS

Written Opinion of the International Searching Authority, Dated Feb. 24, 2009, for International Application No. PCT/US2008/072107.

(Continued)

*Primary Examiner* — Jack Berman
(74) *Attorney, Agent, or Firm* — Boyle Fredrickson, S.C.

(57) ABSTRACT

A high-bandwidth SPM tip scanner is provided that additionally includes an objective that is vertically movable within the scan head to increase the depth of focus for the sensing light beam. Movable optics also are preferably provided to permit targeting of the sensing light beam on the SPM's probe and to permit the sensing light beam to track the probe during scanning. The targeting and tracking permit the impingement of a small sensing light beam spot on the probe under direct visual inspection of focused illumination beam of an optical microscope integrated into the SPM and, as a result, permits the use of a relatively small cantilever with a commensurately small resonant frequency. A high-bandwidth tip scanner constructed in this fashion has a fundamental resonant frequency greater than greater than 500 Hz and a sensing light beam spot minor diameter of less than 10 μm. Images can be scanned on large samples having a largest dimension exceeding 7 mm with a resolution of less than 1 Angstrom and while scanning at rates exceeding 30 Hz.

39 Claims, 15 Drawing Sheets

U.S. PATENT DOCUMENTS

| | | |
|---|---|---|
| 2005/0061970 A1 | 3/2005 | Knebel et al. |
| 2005/0242283 A1 | 11/2005 | Hasegawa et al. |
| 2006/0097163 A1 | 5/2006 | Hoen et al. |
| 2006/0112760 A1 | 6/2006 | Hansma et al. |
| 2006/0191329 A1 | 8/2006 | Adderton et al. |
| 2006/0230474 A1 | 10/2006 | Mininni et al. |
| 2006/0272398 A1 | 12/2006 | Hwang et al. |
| 2006/0284083 A1 | 12/2006 | Kurenuma et al. |
| 2007/0033991 A1 | 2/2007 | Rice et al. |
| 2008/0055598 A1 | 3/2008 | Haaheim |
| 2009/0032706 A1 | 2/2009 | Prater et al. |

FOREIGN PATENT DOCUMENTS

| | | |
|---|---|---|
| WO | 0123939 A2 | 4/2001 |
| WO | 03/009305 | 1/2003 |

OTHER PUBLICATIONS

S. Morita, H. Yamada, and T. Ando, Japan AFM roadmap 2006. Nanotechnol. 18:08401 (10 pages) (2007).

T. Uchihashi, H. Yamashita, and T. Ando, Fast Phase Imaging in Liquids Using a Rapid scan Atomic Force Microscope. Appl. Phys. Lett. 89, 213112 (3 pages) (2006).

N. Kodera, M. Sakashita, and T. Ando, A Dynamic PID Controller for High-Speed Atomic Force Microscopy. Rev. Sci. Instrum. 77(8): 083704 (7 pages) (2006).

H. Koide, T. Kinoshita, Y. Tanaka, S. Tanaka, N. Nagura, G. Meyer zu Hörste, A. Miyagi, and T. Ando, Identification of the Specific IQ Motif of Myosin V from which Calmodulin Dissociates in the Presence of Ca2+. Biochemistry 45(38): 11598-11604 (2006).

M. Yokokawa, C. Wada, T. Ando, N. Sakai , A. Yagi, S.H. Yoshimura and K. Takeyasu, Fast-Scanning Atomic Force Microscopy Reveals the ATP/ADP-Dependent Conformational Changes of GroEL. EMBO J. 25:4567-4576 (2006).

M. Yokokawa, S.H. Yoshimura, Y. Naito, T. Ando, A. Yagi, N. Sakai, K. Takeyasu, Fast-Scanning Atomic Force Microscopy Reveals the Molecular Mechanism of DNA Cleavage by Apalendonuclease. IEE Proc Nanobiotechnol. 153 (4):60-66 (2006).

T. Ando, T. Uchihashi, N. Kodera, A. Miyagi, R. Nakakita, H. Yamashita and M. Sakashita, High-speed Atomic Force Microscopy for Studying the Dynamic Behavior of Protein Molecules at Work. Jpn. J. Appl. Phys. 45(3B):1897-1903 (2006).

T. Uchihashi, N. Kodera, H. Itoh, H. Yamashita and T. Ando, Feed-forward Control for High-Speed AFM Imaging of Biomolecules. Jpn. J. Appl. Phys. 45(3B):1904-1908 (2006).

T. Ando, T. Uchihashi, N. Kodera, A. Miyagi, R. Nakakita, H. Yamashita and K. Matada, High-Speed AFM for Studying the Dynamic Behavior of Protein Molecules at Work. e-J. Surf. Sci. Nanotech. 3:384-392 (2005).

N. Kodera, H. Yamashita and T. Ando, Active Damping of the Scanner for High-speed Atomic Force Microscopy. Rev. Sci. Instrum. 76: 053708 (5 pages) (2005).

N. Kodera, T. Kinoshita, T. Ito and T. Ando, High-resolution Imaging of Myosin Motor in Action by a High-speed Atomic Force Microscope. Adv. Exp. Med. Biol. 538:119-127 (2003).

R. Ishikawa, T. Sakamoto, T. Ando, S. Higashi-Fujime and K. Kohama, Polarized Actin Bundles Formed by Human fascin-1: Their Sliding and Disassembly on Myosin II and Myosin V in vitro. J. Neurochem. 87:676-685 (2003).

T. Ando, N. Kodera, Y. Naito, T. Kinoshita, K. Furuta & Y.Y. Toyoshima, A High Speed Atomic Force Microscope for Studying Biological Macromolecules in Action. ChemPhysChem 4:1196-1202 (2003).

Ando, T., N. Kodea, D. Mauyama, E. Takai K. Saito & A. Toda, A High-speed Atomic Force Microscope for Studying Biological Macromolecules in Action. Jpn. J. Appl. Phys. 41:4851-4856 (2002).

Ando, T., N. Kodera, E. Takai, D. Maruyama, K. Saito & A. Toda, A High-speed Atomic Force Microscope for Studying Biological Macromolecules. Proc. Natl. Acad. USA 98:12468-12472 (2001).

Amitani, I., T. Sakamoto & T. Ando, Link between the Enzymatic and Mechanical Behavior in an Actomyosin Motor. Biophys. J. 80:379-397 (2001).

Sakamoo T., I. Amtani, E. Yokota & T. Ando, Direct Obsevaton of Pocessve Movement by Indvdual Myosin V Molecules. Biochem. Biophys. Res. Commun. 272:586-590 (2000).

Adachi K., K. Kinosita, Jr. & T. Ando, Single-fluorophore Imaging with an Unmodified Epifluorescence and Conventional Video Camera. J. Microscopy 195:125-132 (1999).

Nakajima H., Y. Kunioka, K. Nakano, K. Shimizu, M. Seto & T. Ando, Scanning Force Microscopy of the Interaction Events between a Single Molecule of Heavy Meromyosin and Actin. Biochem. Biophys. Res. Commun. 234:178-182 (1997).

Kunioka Y. & T. Ando, Innocuous Labeling of the Subfragment-2 region of Skeletal Muscle Heavy Meromyosin with a Fluorescent Polyacrylamide Nanobead and Visualization of Individual Heavy Meromyosin Molecules. J. Biochem. 119:1024-1032 (1996).

Yamamoto T., S. Nakayama, N. Kobayashi, E. Munekata T. Ando, Determination of Electrostatic Potential around Specific Locations on the Surface of Actin by Diffusion-enhanced Fluorescence Resonace Energy Transfer. J. Mol. Biol. 241:714-731 (1994).

Hansma, P., G. Schitter, G.E. Fantner, C. Prater, High-Speed Atomic Force Microscopy. Science 314, 601; DOI: 10.1126/science.1133497 (2 pages) (2006).

Picco., L.M., L. Bozec, A. Ulcinas, D.J. Engledwe, M. Antognozzi, M.A. Horton, M.J. Miles, Breaking the Speed Limit with Atomic Force Microscopy. Nanotechnology 18: 044030 (4 pages) (2007).

Infinitesima, The VideoAFM—Next generation, Real-Time AFM Imaging (4 pages) (undated).

Veeco Dimension 3100 Atomic Force Microscope (AFM), Procedure (13 pages) (Nov. 20, 2006).

NanoStation II—Puco Tech, http://pucotech.en.ec21.com/product_detail.jsp?group_id=GC01640383&product_id=CA... (5 pages) (Feb. 23, 2007).

T. Uchihashi, N. Kodera, H. Itoh, H. Yamashita, T. Ando Feed-Forward Compensation for High-Speed Atomic Force Microscopy Imaging of Biomolecules. Jpn. J. Appl. Phys. 45:1904-1908 (2006).

G. Schitter, G.E. Fantner, P.J. Thurner, J.Adams, P.K. Hansma, Design and Characterization of a Novel Scanner for High-Speed Atomic Force Microscopy, University of California Santa Barbara, Physics Department, pp. 819-824 (undated).

S. Hafizovic, D. Barrettino, T. Volden, J. Sedivy, K.U. Kirstein, O. Brand, A. Hierlemann, Single-Chip Mechatronic Microsystem for Surface Imaging and Force Response Studies, PNAS, vol. 101, No. 49, pp. 17011-17015 (Dec. 2004).

G.E. Fantner, G. Schitter, H.J. Kindt, T. Ivanov, K. Ivanova, R. Patel, N. Holten-Andersen, J. Adams, P.J. Thurner, I.W. Rangelow, P.K. Hansma, Components for High Speed Atomic Force Microscopy. Ultramicroscopy 106 (2006) 881-887.

T. Ando, High-Speed SPM, 14 High Speed SPM, pp. 109-116.

M.J. Rost, L. Crama, P. Schakel, E. van Tol, G.B.E.M. van Velzen-Williams, C.F. Overgauw, H. ter Horst, H. Dekker, B. Okhuijsen, M. Seynen, A. Vijftigschild, P. Han, A.J. Katan, K. Schoots, R. Schumm, W. van Loo, T.H. Oosterkamp, and J.W.M. Frenken, Scanning Probe Microscopes Go Video Rate and Beyond. Review of Scientific Instruments, 76, 053710 (2005).

Q. Zou, K.K. Leang, E. Sadoun, M.J. Reed, and S. Devasia, Control Issues in High-Speed AFM for Biological Applications: Collagen Imaging Example. Asian J. Control. Jun. 2004; 6(2): 164-178.

G. Schitter, F. Allgower, and A. Stemmer, A New control Strategy for High-Speed Atomic Force Microscopy. Nanotechnology 15 (2004) 108-114.

Q. Zou, C. Vander Giessen, J. Garbini, and S. Devasia, Precision Tracking of Driving Wave Forms for Inertial Reaction Devices. Review of Scientific Instruments, 76, 023701-1 (2005).

G. Schitter, A. Stemmer, and F. Allgower, Robust 2DOF-Control of a Piezoelectric Tube Scanner for High Speed Atomic Force Microscopy, Proceedings of the American Control Conference, Denver, CO Jun. 4-6, 2003 (pp. 3720-3725).

G. Schitter, K.J. Astrom, B. DeMartini, G.E. Fantner, K. Turner, P. Thurner, and P.K. Hansma, Design and Modeling of a High-Speed Scanner for Atomic Force Microscopy, Proceedings of the American Control Conference, Minneapolis, MN, Jun. 14-16, 2004 (pp. 502-507).

S. Devasia, Degang Chen, and Brad Paden, Nonliner Inversion-Based Output Tracking, IEEE Transactions on Automatic Control, vol. 41, No. 7, Jul. 1996 (pp. 930-942).

Notification Concerning Transmittal of International Preliminary Report on Patentability and Written Opinion of the International Searching Authority, Dated Oct. 1, 2009, for International Application No. PCT/US2008/057217.

* cited by examiner

FAST-SCANNING SPM SCANNER AND METHOD OF OPERATING SAME

STATEMENT OF GOVERNMENT INTEREST

This invention was made with United States government support awarded by the following agency: NIST/ATP (Award #70NANB4H3055). The United States has certain rights in this invention.

BACKGROUND OF THE INVENTION

1. Field of the Invention

The present invention is directed to scanning probe microscopes (SPMs), and, more particularly, relates to a scanner for a SPM that can acquire high-quality images at high acquisition rates and to a method of operating such a scanner.

2. Description of Related Art

Scanning probe microscopes (SPMs), such as the atomic force microscope (AFM), are devices which typically use a tip and low forces to characterize the surface of a sample down to atomic dimensions. Generally, SPMs include a probe having a tip that is introduced to a surface of a sample to detect changes in the characteristics of a sample. By providing relative scanning movement between the tip and the sample, surface characteristic data can be acquired over a particular region of the sample and a corresponding map of the sample can be generated.

The atomic force microscope (AFM) is a very popular type of SPM. The probe of the typical AFM includes a very small cantilever which is fixed to a support at its base and which typically has a sharp probe tip attached to the opposite, free end. The probe tip is brought very near to or into contact with a surface of a sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as strain gauges, capacitance sensors, etc. The probe is scanned over a surface using a high resolution three-axis scanner acting on the sample support and/or the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

AFMs may be designed to operate in a variety of modes, including contact mode and oscillating mode. This is accomplished by moving either the sample or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. (Note that many samples have roughness, curvature and tilt that deviate from a flat plane, hence the use of the term "generally parallel.") In this way, the data associated with this vertical motion can be stored and then used to construct an image of the sample surface corresponding to the sample characteristic being measured, e.g., surface topography. Similarly, in another preferred mode of AFM operation, known as TappingMode™ (TappingMode™ is a trademark owned by the present assignee), the tip is oscillated at or near a resonant frequency of the associated cantilever of the probe. A feedback loop attempts to keep the amplitude of this oscillation constant to minimize the "tracking force," i.e. the force resulting from tip/sample interaction. (Alternative feedback arrangements keep the phase or oscillation frequency constant.) As in contact mode, these feedback signals are then collected, stored and used as data to characterize the sample. Note that "SPM" and the acronyms for the specific types of SPMs, may be used herein to refer to either the microscope apparatus or the associated technique, e.g., "atomic force microscopy."

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

As with most measuring devices, AFMs often require a trade off between resolution and acquisition speed. That is, some currently available AFMs can scan a simple surface with sub-angstrom resolution. These scanners are capable of scanning only relatively small sample areas, and even then, at only relatively low scan rates. Traditional commercial AFMs usually require a total scan time typically taking several minutes to cover an area of several microns at high resolution (e.g. 512×512 pixels) and low tracking force. The practical limit of AFM scan speed is a result of the maximum speed at which the AFM can be scanned while maintaining a tracking force that is low enough not to damage or cause minimal damage to the tip and/or sample. Professor Toshio Ando at Kanazawa University in Japan has made tremendous progress with high-speed AFM using an AFM that scans mm-sized samples over small distances, typically less than 2 um. Professor Ando has achieved video scan rates with high resolution for this combination of small samples and small scan sizes.

Other systems, typically called "tip scanners," are known or have been proposed and/or implemented in which the probe is mounted on the scanner. One such system is incorporated in a line of instruments marketed by Veeco Instruments under the name Dimension®. That system employs a relatively massive tube scanner for the Z-actuator and has relatively low bandwidth. Another system is disclosed in Published U.S. Application Ser. No. 2006/00272398 to Hwang. In the system of the Hwang application, the probe is mounted on an actuator that, in turn, is mounted on an optical objective that focuses incoming laser light. The objective, in turn, is mounted on an x-y actuator. However, because the objective and other optics of the system are fixed relative to the probe, relatively large probes (having a width of at least of 20 µm, a length of more than 40 µm) are required to assure positioning of the focused laser beam on the cantilever. The typical probes used also have a resonant frequency $F_o$ of roughly 400 kHz and a quality factor Q of around 400. The resulting response bandwidth for these probes is of the order of $F_o/Q \approx 1$ kHz. Due in part to its low-bandwidth probe, the resulting system has a maximum scan rate of less than 30 Hz (or 30 scan lines per second), and more typical imaging speeds are around 1 Hz.

On the other hand, SPMs that can acquire data rapidly can also suffer unacceptable tradeoffs. One such system is marketed by Infinetisma under the name Video AFM™. The Video AFM operates at video rates but with significant compromises to signal-to-noise ratio and resulting image quality. The Infinitesima system also operates in contact mode with force feedback that is not fast enough to respond to variations in sample corrugation within a scan line. In this system, the sample or the probe is mounted on a tuning fork. The probe is driven into contact with the sample while the sample or the probe is scanned by vibrating the tuning fork at or near its resonant frequency. Because the tuning forks need to be quite small (typically on the order of a few mm in size) to achieve high resonant frequencies, they are very sensitive to being loaded by extra mass. As a result, only very small (on the order of a few mm in size) samples or cantilever substrates can be mounted to the tuning fork without degrading the performance.

It is known to combine an AFM with a conventional optical microscope to provide a view of the surface features of the sample. Notably, high performance microscope objectives have a short working distance and must be positioned close to the sample surface. High resolution optical imaging is therefore difficult to implement in combination with traditional AFM detectors because there is insufficient space between the bottom of the objective and the probe to accommodate the geometry for the incoming and outgoing detection beams. Because of the weight of the optical microscope, it is difficult to incorporate the optics of an optical microscope into the scanner of the AFM without unacceptably reducing the instrument's scan rate.

Some optical microscope-equipped SPMs have attempted to overcome this limitation by directing laser light through the microscope objective. One such system has been commercialized by Surface Imaging Systems under the name ULTRAOBJECTIVE™ and is disclosed in international publication number WO 01/23 939. In the ULTRAOBJECTIVE™ system, a near field AFM probe, a z actuator assembly for the probe and optical focusing system are provided in a single housing in order to provide an interchangeable objective that can be inserted in the objective turret of an optical microscope. Its objective is fixed relative to the probe, and it lacks any mechanism for dynamically focusing the laser beam onto the probe.

Another drawback of conventional optical microscope equipped AFMs is that the optical microscope is provided only to allow the user to inspect the sample. It plays no role in focusing the laser beam on the cantilever. Hence, even if the system were provided for focusing the light spot on the cantilever, no mechanism would be available to provide the user with optical feedback during a focusing process.

The need therefore has arisen to provide a tip scanner for a SPM of a sufficiently high lowest fundamental lowest resonant frequency and sufficiently high resolution to make high resolution scans at high scan rates.

The need has additionally arisen to provide a SPM that can focus and target a sensing light beam on a probe, thereby permitting the use of relatively small focused beam spots and small probes in the SPM.

SUMMARY OF THE INVENTION

In accordance with a first aspect of the invention, a SPM with an integrated optical microscope is provided having a scan had that can acquire precise imaging data very rapidly. An objective is provided in the scan head to focus sensing and illumination light on the probe of the SPM. The SPM has a relatively stiff, relatively light-weight scanner having a high fundamental resonant frequency. The objective preferably is vertically movable within the scan head to increase the focus range for a laser or other sensing light source, permitting the use of a relatively high cantilever with a commensurately high resonant frequency. The movable objective also permits illumination light to be focused on distinctly spaced objects, such as the probe and a sample surface located well beneath the probe. The objective is preferably also a "tracking objective" that moves with the scanner in the x-y plane to allow a sensing light beam's focused spot to remain focused on the probe during scanning. Optics are also preferably provided to permit panning of both the illumination beam of an integrated optical microscope and the sensing light beam as a unit. This panning permits the alignment or targeting of the focused sensing light beam on the cantilever under direct or indirect visual inspection of the focused illumination beam. This panning permits the use of an even smaller cantilever with a commensurately smaller resonant frequency.

In accordance with another aspect of the invention, an SPM is provided having a tip scanner including an objective that bears the tip. The tip scanner has a lowest fundamental resonant frequency greater than 2 kHz, preferably greater than 5 kHz, and even more preferably greater than 9 kHz. The objective is preferably a scanned objective that may or may not be moved by the actuator.

In accordance with another aspect of the invention, a SPM is provided having a tip scanner including an objective that bears the tip. The tip scanner has a fundamental resonant frequency greater than 500 Hz and a sensing light beam focused spot diameter of less than 10 μm. Preferably, the tip scanner has a fundamental resonant frequency greater than greater than 1 kHz and a sensing light beam focused spot diameter of less than 5 μm.

A SPM configured in accordance with the invention could be used to scan a wide variety of samples, including patterned wafers, biological samples, polymers, thin films, and data storage device component.

In accordance with still another aspect of the invention, a method is provided of scanning a sample with a SPM that includes obtaining images with a resolution of less than 1 Angstrom while scanning along lines of at least 4 μm at rates exceeding 50 Hz. These rates preferably exceed 100 Hz or 200 Hz, and even more preferably exceed 400 Hz.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

As discussed in the "Summary" section above, the invention relates to a fast-acting scan head for a scanning probe microscope (SPM) such as an atomic force microscope (AFM). The scan head includes a probe, an actuator for the probe, and an optical objective that collectively form a scanner that moves as a unit for scanning. They are also arranged to permit the sample to be inspected at engagement using an illumination beam, and to place the focal point of the sensing light beam on the cantilever of the probe.

The objective may also be movable in the z direction to increase the range of focus of the objective. It also preferably comprises a targeting objective that moves with the scanner so as to remain focused on the cantilever during scanning. An AFM will now be disclosed having a scan head constructed in accordance with a preferred embodiment of the invention, it being understood that the scan head as disclosed can be used with a variety of other AFMs, other SPMs, and even other probe-based instruments. It should also be understood that a wide number of variations could be made to the disclosed scan head without departing from the spirit of the invention.

Figure 1:
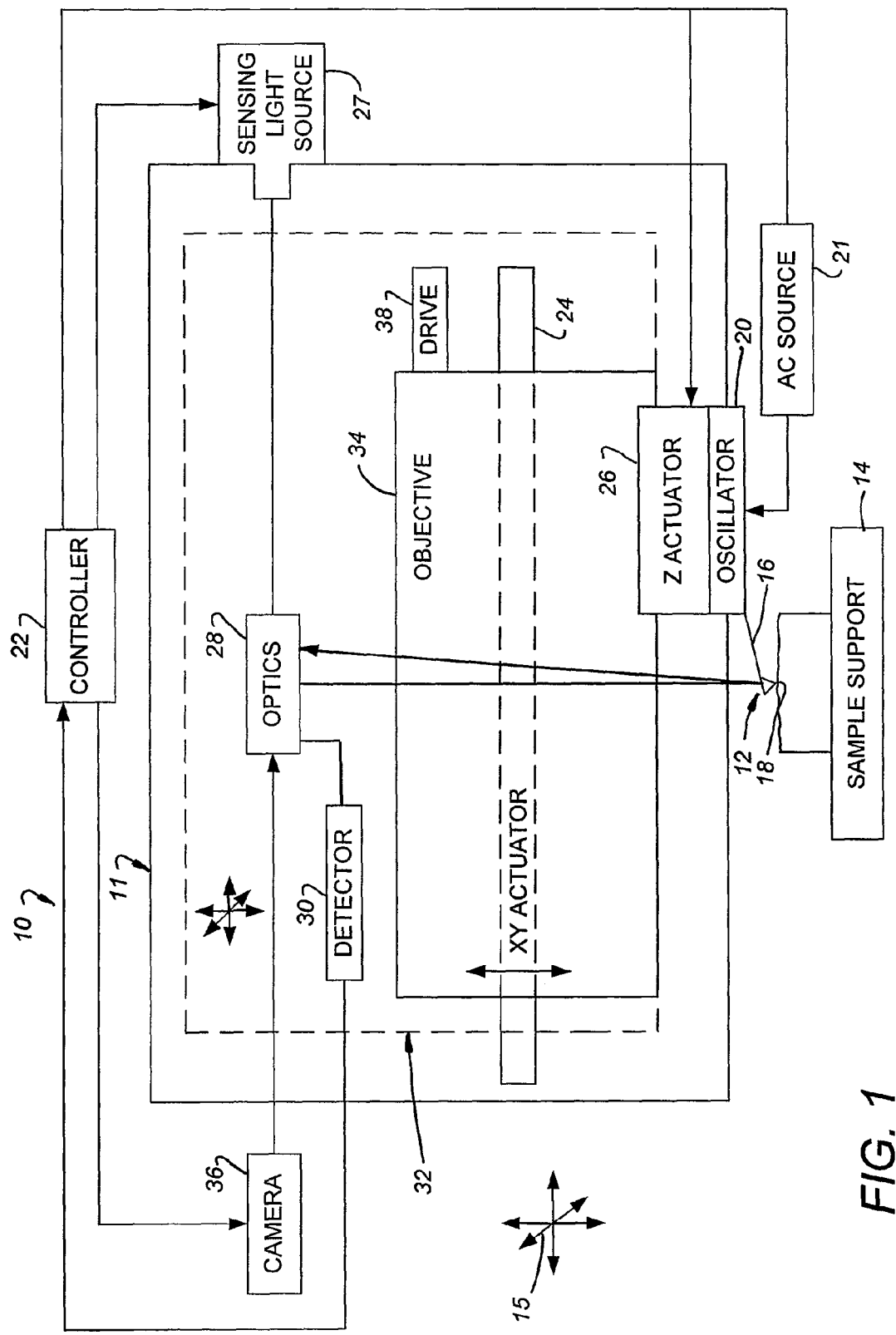
FIG. 1 schematically illustrates an AFM with an integrated optical microscope constructed in accordance with a preferred embodiment of the invention.

Turning to a FIG. 1, an AFM 10 is schematically illustrated incorporating a scan head 11 constructed in accordance with the present invention. The scan head 11 is mounted over a sample support 14 and bears a probe 12. An actuator (not shown) drives the scan head 11 and/or sample support 14 to move in at least the z direction, and preferably the x-y direction as well, as represented by the arrows 15 in FIG. 1. The probe 12 includes a cantilever 16 and a tip 18 mounted on the free end portion of the cantilever 16. The probe 12 may be coupled to an oscillating actuator or drive 20 that is used to drive probe 12 to oscillate, for instance, at or near the cantilever's resonant frequency. The oscillating drive 20 may be coupled to an x-y actuator scanner 24 (described below) and probe 12 or may be formed integrally with the cantilever 16 of probe 12 as part of a self-actuated cantilever/probe. An electronic signal is applied from an AC signal source 21 under control of an AFM controller 22 to drive 20 to oscillate probe 12, preferably at a free oscillation amplitude $A_o$. The signal source 21 may be contained within the controller 22. Controller 22 typically consists of at least one computer and associated electronics and software that perform the tasks of data acquisition and control of the AFM. The controller 22 may consist of a single integrated analog and/or digital unit, or may consist of a distributed array of electronics and software. The controller 22 may use a typical desktop computer, a laptop computer, an industrial computer and/or one or more embedded processors. It will most likely be located off-board the scan head 11.

Probe 12 can also be actuated to move in the x and y directions relative to the sample support 14 using a suitable x-y actuator 24 mounted on the scan head 11. The preferred x-y actuator is described below. In the preferred embodiment, the moveable portions of the x-y actuator 24 and the elements that move with those portions during scanning form a "scanner." For purposes of this application, the term "tip scanner" means an assembly capable of scanning the probe 12 in a plane generally parallel to the sample (the x-y plane).

In the preferred embodiment, the scanner carries the probe 12, and additionally z-actuator 26, and objective 34. Note that the z-actuator can alternatively or additionally be configured to be separate from the scanner and move the sample instead. Probe 12 can also be actuated to move in the z direction using a z-actuator 26. The z-actuator preferably comprises a piezoelectric-stack, because the scanner is configured to scan the probe over the sample rather than vice versa, the scanner is commonly referred to as a "tip scanner." Alternatively, the scanner, or portions of it, may be employed to move sample support 14. For instance, the probe 12 may be mounted on a z-actuator that drives the probe to move in a vertical or z direction, and the sample support 14 may be mounted on a separate x-y actuator that drives the sample support 14 to move in the x-y plane.

The actuators for the x, y and z axes are preferably piezoelectric stacks. However, they can also employ any number of alternative actuation technologies, including but not limited to, other piezoelectric devices, actuators formed from electrostrictive, magnetorstrictive, electrostatic, inductive, and/or voice coil drive mechanisms and other actuators that generate a motion in response to an input signal.

Probe 12 is preferably a microfabricated cantilever with an integrated tip. For optimal high speed performance, the preferred dimensions of the probes are of the order of 35 µm or less in length with resonant frequencies greater than 800 kHz, but many other dimensions including larger and smaller cantilevers can be used successfully. Probe 12, alternatively can be any of the wide field of probes that are used in scanning probe microscopy, including, but not limited to, probes for magnetic force microscopy, electric force microscopy, surface potential microscopy, chemical force microscopy, probes with carbon nanotube or carbon nanofibers, and probes for aperture-based or apertureless near-field scanning optical microscopy.

In operation, as the probe 12 is oscillated and brought into contact with a sample on the sample support 14, sample characteristics can be monitored by detecting changes in the oscillation of probe 12. In particular, a beam from a sensing beam light source 27 is directed by optics 28 in the scan head 11 towards the backside of probe 12 and is then reflected back to the optics and then directed towards a detector 30, such as a four quadrant photodetector, that is located on the scan head 11 off-board the scanner. The sensing light source 27 is typically a laser, preferably a visible or infrared laser diode. The sensing light beam can also be generated by other light sources, for example a He—Ne or other laser source, a superluminescent diode (SLD), a LED, an optical fiber, or any other light source that can be focused to a small spot. The term "laser" in the rest of this specification should be understood to cover a wide variety of these and other alternative light sources.

As the scanning light beam translates across the detector 30, appropriate signals are transmitted to controller 22, which processes the signals to determine changes in the oscillation of probe 12. Controller 22 typically generates control signals to actuate the z-actuator 26 under feedback to maintain a setpoint characteristic of the oscillation of probe 12. For example, controller 22 may be used to maintain the oscillation amplitude at a setpoint value, $A_S$, to insure a generally constant force between the tip and the sample. Alternatively, a setpoint phase or frequency may be used.

Still referring to FIG. 1, the scan head 11 also supports an optical microscope 32 permitting the optical inspection of the sample and also permitting focusing of the sensing light beam. It may be controlled, at least in part, by the controller 22. The microscope 32 includes a portion of the optics 28 as well as the objective 34. The optics 28 direct both the illumination beam and the sensing light beam to the probe 12 and direct the reflected sensing light beam to the detector 30 and the reflected illumination beam to a receiver 36. The objective 34 preferably may additionally be focused on a sample that is beyond the position of the cantilever. In this case the illumination beam is focused on the sample, and an image of the same is transmitted through the objective 34 and to the receiver 36. The receiver 36 may, for instance, be an imaging device such as a camera. The illustrated camera is positioned off-board the scan head 11 and serves both as a light source for the optical microscope 32 and as the imaging device. A CCD camera is a suitable imaging device. Alternatively or additionally, a separate light source and receiver could be provided on-board and/or off-board the scan head 11. In addition to or instead of a camera, the receiver 36 could be the human eye.

The illumination beam may be any form of light that can be observed either visually or with suitable instrumentation. It preferably comes from an ultra bright Light Emitting Diode (LED) but may also be an incandescent, fluorescent, or arc-based light source. It may be either monochromatic (e.g. a red LED) or a wider spectrum source approximating white light or even being white light A workstation is also provided in the controller 22 and/or in a separate controller or system of connected or stand-alone controllers, that receives the collected data from the controller and manipulates the data obtained during scanning to perform the point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable storage medium, examples including but not limited to a hard disk, network storage, a flash drive, or a CD ROM.

The objective 34 is located in the optical path from the optics 28 to the probe 12. Preferably, it bears the z actuator 26 and the probe 12 so that all three devices move vertically as a unit. It also is preferably a scanned objective. That is, it is preferably coupled to the x-y actuator 24 so that the objective 34, z actuator 26, and probe 12 all move horizontally in the x-y plane under the power of the x-y actuator 24. In the preferred embodiment, the objective 34 accomplishes two tasks: (1) focusing the sensing light beam onto the probe; and (2) providing an optical image of the probe and/or sample. In alternative embodiments, the objective can be arranged to accomplish only one of these tasks and/or additional tasks. In the preferred embodiment, the objective 34 focuses incoming sensing and illumination light on an object beneath the scan head 11, typically the cantilever and/or the sample. In addition, in conjunction with the optics 28, it directs outgoing illumination light to the receiver 36 and outgoing sensing light to the detector 30. The outgoing illumination light forms an image of the object. A portion of the objective 34 containing its optics can be driven to move in the z direction under power of a drive 38 in order to extend the focus range of the objective as discussed below.

The interaction between the optics 28 and the objective 34 will now be described with reference to FIG. 2.

As discussed briefly above in connection with FIG. 1, the optics 28 and objective 34 direct the incoming sensing light beam to the cantilever 16 and direct the outgoing sensing light beam to the detector 30. The illumination beam is also directed to and from the objective 34 by a mirror 220 located above the remainder of the optics 28. A collimating lens 50 and an aperture 52 are located upstream from the optics 28 in the direction of incoming sensing light beam transmission. The collimating lens 50 transforms incoming light into a beam of parallel rays. It could be formed integrally with or contained in the sensing light beam source 27. The aperture 52 shapes the focused light beam at the cantilever 16 plane so as to have a generally elliptical or rectangular shape having a relatively narrow width or "minor diameter" to minimize the spot size, and also to maximize optical lever sensitivity. The minor diameter refers to the measurement of the spot size across the direction of least extent. This permits use of a smaller cantilever as described in detail below. Similarly-shaped apertures, such as ovoid apertures, could also be used for this purpose. This does not mean that an aperture is mandatory to the system. An aperture could be eliminated entirely or replaced by a circular aperture, in which case the minor diameter would be the only diameter.

Figure 2:
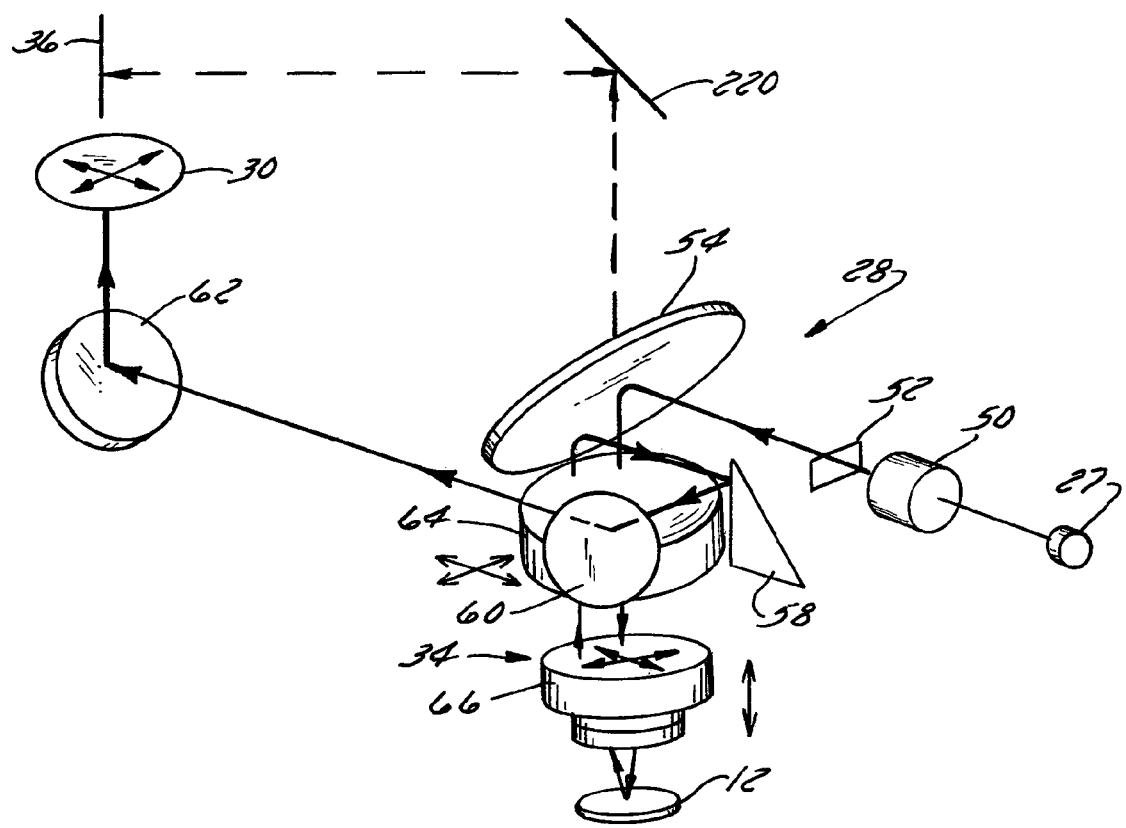
FIG. 2 is a somewhat schematic perspective view of the optics of the instrument of FIG. 1.

Still referring to FIG. 2, the optics 28 include a device that deflects the shaped sensing light beam downwardly from the aperture 52. A standard mirror would be suitable for this purpose if some other mechanism were provided for directing the illumination beam through the objective 34. However, in the preferred example is in which illumination beam enters the objective 34 directly from above, the device preferably is a filter 54 that is reflective of the wavelengths of sensing light beam (on the order of 690 nm or higher for a red laser diode) and that is transmissive of the wavelengths of the illumination beam, generally covering a wide range of the visible light spectrum. For an alternate preferred embodiment employing an infrared light source for the sensing beam, the cutoff wavelength for filter 54 would be correspondingly higher. A prism having two effective mirrors 58 and 60 is provided for directing outgoing sensing light to a mirror 62. The mirror 62 then deflects the reflected light upwardly to the detector 30.

Still referring to FIG. 2, in the preferred embodiment, the objective 34 is a dual lens achromatic objective. It includes first and second vertically spaced lens assemblies 64 and 66 that focus on incoming sensing light beam to a focal point which, ideally, is located on the back surface of the cantilever 16. Each of the lens assemblies 64 and 66 is formed from two lenses affixed to one another. This combination of four lenses reduces the aberration of the objective to the levels desired to both focus the sensing light beam onto the probe and provide a high quality color image of the sample from the illumination beam. Lenses 64 and 66 are preferably achromatic doublets. Each lens preferably is customized to provide bright optical imaging and to provide a relatively broad wavelength spectrum.

The lenses of the preferred embodiment were custom designed using ZEMAX lens optimization software to minimize the optical path difference over the wavelengths of the illumination beam. In the preferred embodiment, the lens assembly has a working distance of greater than 8 mm and more preferably greater than 10 mm.

The objective 34 is also preferably relatively wide so as to provide a relatively large numerical aperture (NA) to accommodate significant cantilever bending-typically on the order of ±4°. The preferred objective has an NA of more than about 0.28, preferably more than about 0.35, and most preferably of about 0.40. In the preferred embodiment, the light path for the illumination beam and the probe/sample imaging system is stepped down due to a numerical aperture of 0.28 to keep the aberrations at an acceptable level for the probe/sample image. A larger fraction of the objective is used to accommodate the reflected sensing light beam.

This combination of large numerical aperture and careful attention to minimizing aberrations produces the desired small laser spot diameter of less than 20 µm, preferably less than 10 µm, and most preferably of about 5 µm.

While the above description outlines the objective construction in the preferred embodiment, it is also possible to use a wide variety of different objective arrangements including more or fewer lenses. For a design that is optimized for maximum scan speed at the possible expense of image quality, it is possible to replace the four element objective with an objective with a single lens. Aspheric lenses, for example formed from lighter weight plastics, can achieve the combination of low aberration, wide NA, and low mass. Conventional stock lenses can also be used in a wide variety of configurations to form a suitable objective.

Figure 3A:
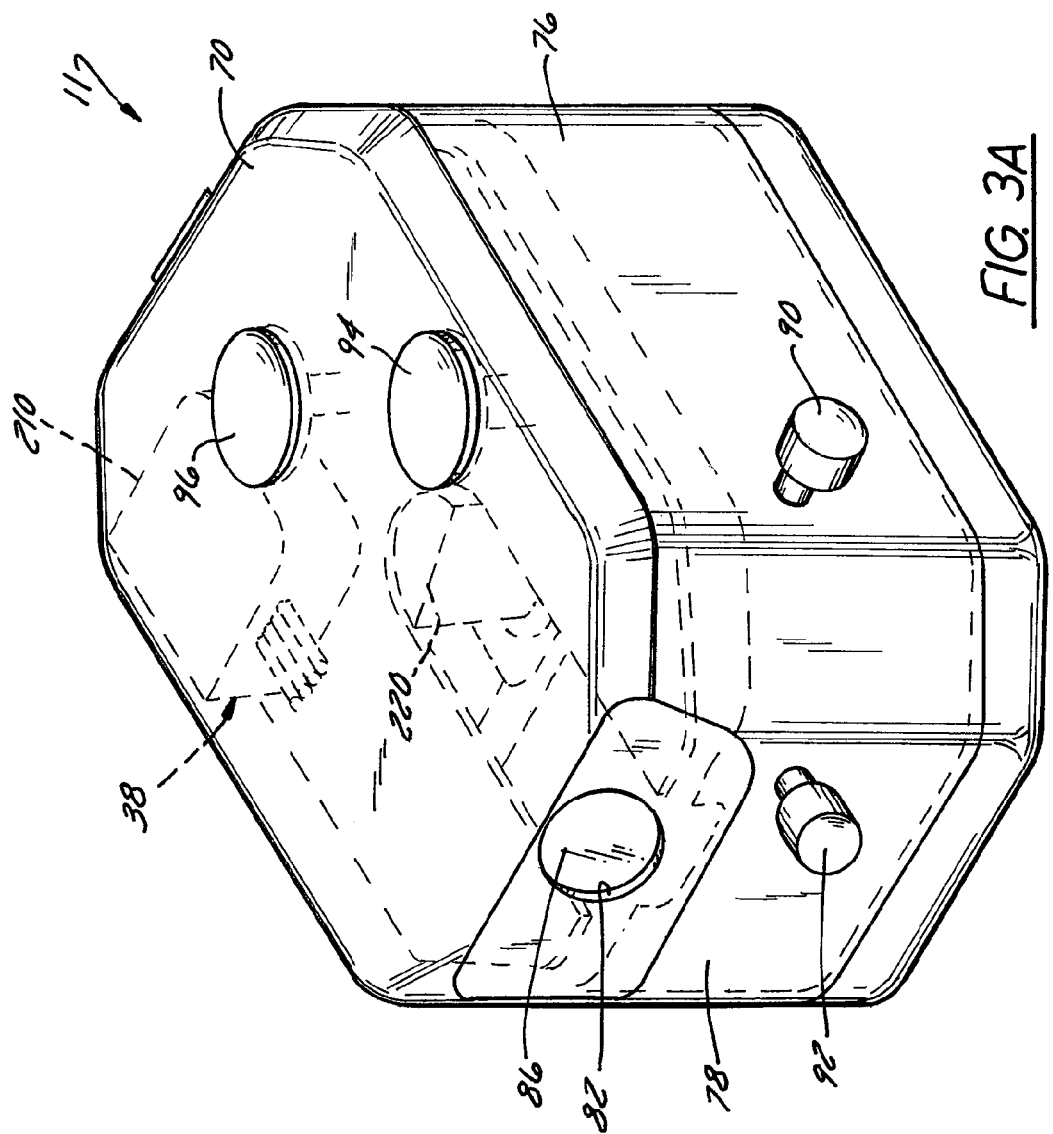
FIG. 3A is a perspective view of a scan head of the instrument of FIG. 1.
Figure 3B:
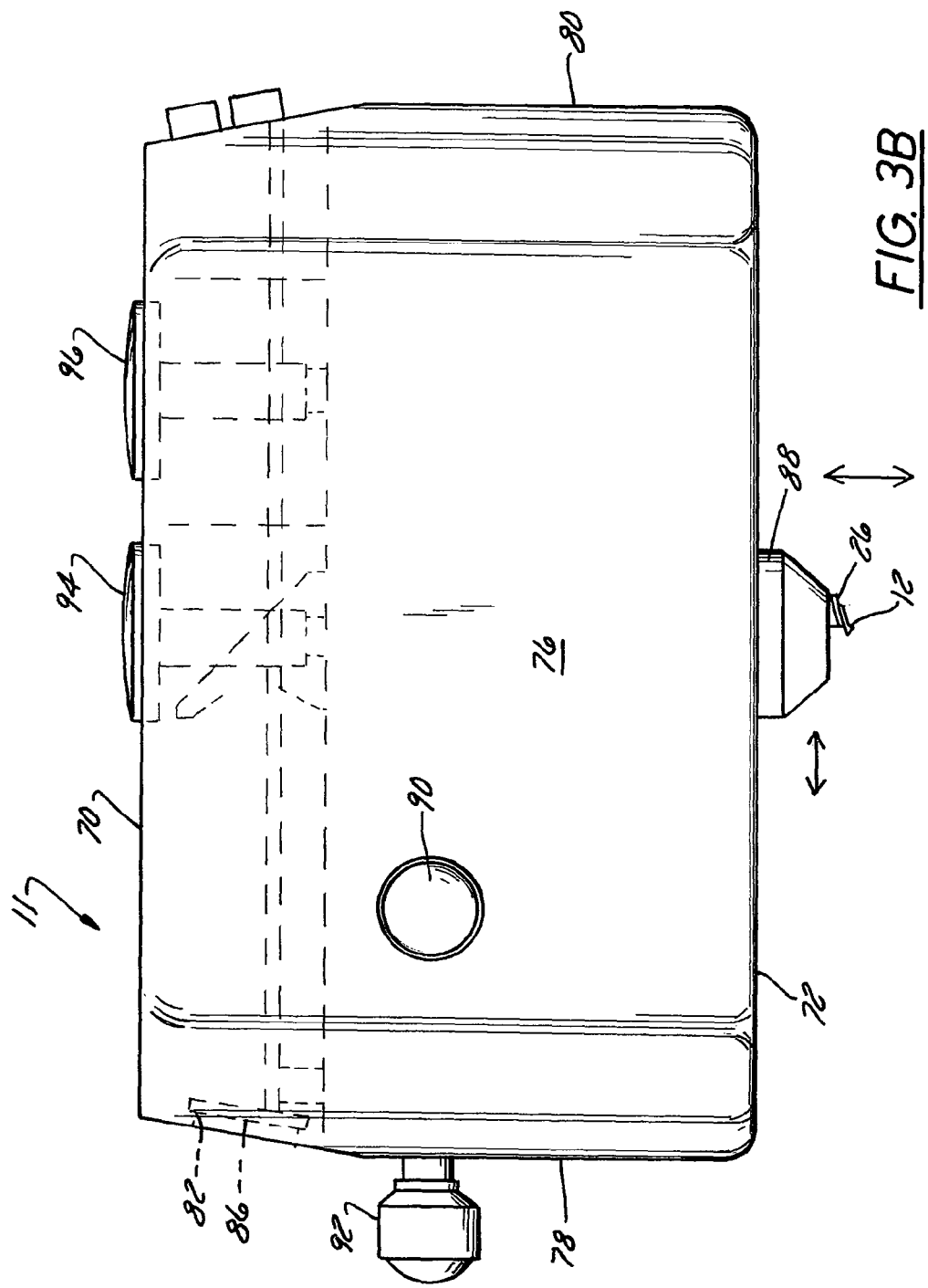
FIG. 3B as a side elevation view of the scan head of FIG. 3A.
Figure 4:
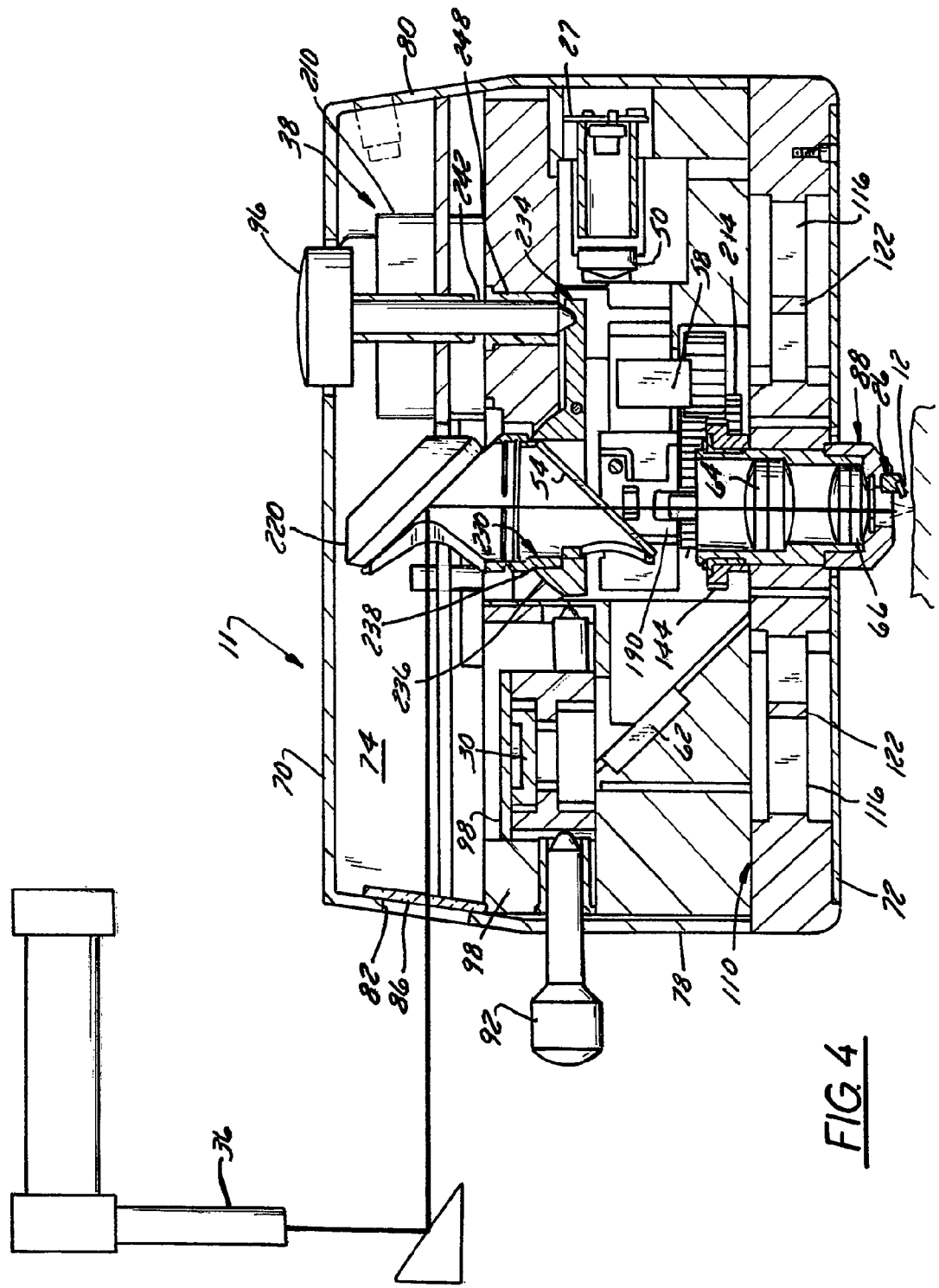
FIG. 4 is a sectional elevation view of the scan head of FIGS. 3A and 3B.

Referring now to FIGS. 3A, 3B, and 4, a preferred embodiment of the scan head 11 is shown less schematically. Scan head 11 includes an enclosed housing having upper and lower surfaces 70, 72, left and right surfaces 74, 76, and front and rear surfaces 78, 80. A first aperture 82 is formed in the front surface 72 for receiving a window 86 for the illumination light beam, and a second aperture is formed in the bottom surface 76 for receiving objective housing 88. First and second knobs 90, 92 extend from the right and front surfaces 76 and 78, and third and fourth knobs 94 and 96 extend upward from the upper surface 70. The first and second knobs 90 and 92 are threaded into a support 98 (FIG. 4) in the scan head 11 and engage a carriage 100 that bears the detector 30. These knobs 90 and 92 can be manipulated to position the carriage 98 in the x-y plane to assure that the detector 30 is centered over the incoming sensing light beam. This permits the use of a smaller detector, potentially further increasing scan rate.

Figure 6:
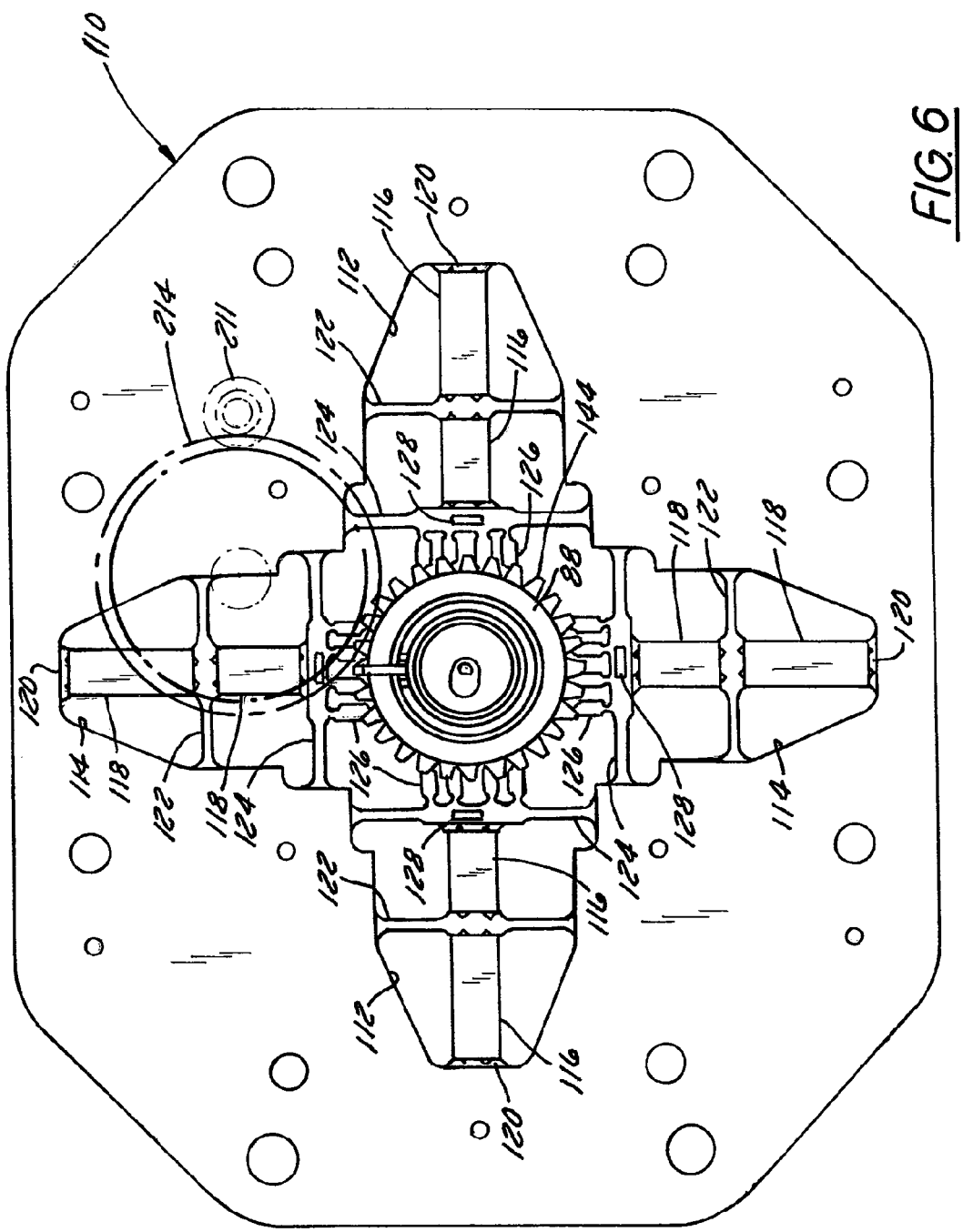
FIG. 6 is a top plan view of a portion of the scan head of FIGS. 3A-4, including an x-y actuator, and objective, and an associated support structure.

The objective 34 is preferably mounted in the scan head 11 so as to permit the objective 34 to be moved up and down relative to the probe to increase the range of focus of the objective, hence permitting the use of a smaller cantilever 16 and potentially further increasing scan rate. This vertical measurement also permits focusing of the illumination beam on an object beneath the cantilever 16. This facilitates, for example, sample inspection in preparation for probe/sample engagement. It also is of relatively low mass so as to not significantly decrease the scanner's fundamental resonant frequency and, hence, maintain high scan rates. Toward this end, the lenses 64 and 66 that form the optics of the objective are mounted in the housing 88 or "barrel" as seen in FIG. 4 so as to be movable vertically relative to the barrel. The barrel 88 is mounted on the x-y actuator 24. A preferred arrangement for the mounting of the barrel on the x-ray-y actuator is shown in FIG. 6. Before describing the preferred arrangement in detail, it should be noted that an x-y actuator of the type described herein was developed by Dr. Paul Hansma and is assigned to The Regents of the University of California. It is described, e.g., in published U.S. Patent Application Ser. No. 2006/0112760, the subject matter of which is incorporated herein by reference.

The preferred arrangement includes a rigid mounting plate or scanner stage 110 fixed to the interior support of the scan head 11. The rigid mounting plate 110 has a generally-cross-shaped aperture formed centrally therein that has two sets of orthogonally arranged x and y segments 112 and 114. Two sets of x and y piezoelectric actuators 116 and 118 extend longitudinally along the centers of the respective segments 112, 114. One of the x-actuator sets 116 will now be described, it being understood that this description applies equally to the other x-actuator and the y-actuators 118 as well. One actuator of each set 116 has an outer end mounted on the end of the respective aperture segment 112 by a mount 120, and an inner end supported on a central flexure 122 that spans the aperture segment 112. The other actuator of each set 116 has an outer end connected to the central flexure 122 and an inner end connected to a second flexure 124 that also spans of the aperture segment 112. The first or central flexure 122 of each set is not required but is beneficial because it increases the lowest resonant frequency of the associated piezoelectric actuator.

Actuators 116, 118, in combination with the flexures 122, 124, and 126, provide an effective stiffness that, when loaded by the moving mass of the scanner, is designed to provide a fundamental resonant frequency of the scanner of at least 2 kHz, more preferably of at least 5 kHz, and even more preferably of more than 9 kHz. The significance of this feature will now be explained.

In scanning probe microscopes, feedback loops are used for multiple purposes. First, a feedback loop is used to attempt to maintain relatively constant value of average tip sample interaction by maintaining the cantilever deflection, amplitude, phase and/or frequency constant. This is often referred to as the z-feedback loop. The speed of the z-feedback loop is governed by the speed of the cantilever response, the z-actuator, and any associated electronics and amplifiers in the feedback loop. Another common form of feedback is position feedback. This type of feedback attempts to control the relative XY position of the scanner to compensate for thermal drift, and nonlinearities, hysteresis and/or creep in the actuator.

The fundamental resonant frequency $F_o$ of a scanner can limit the usable feedback feedback bandwidth of the scanner. In general, the dynamic behavior of a mechanical system is determined by the fundamental resonant frequency. The fundamental resonant frequency is characterized by a sharp increase in phase lag and gain in the frequency response of a mechanical system. The addition of feedback control is used to modify the dynamic behavior by changing the gain and phase of a system as a function of frequency. For example, consider a simple feedback loop, for example a PI (proportional, integral) feedback loop common in probe microscopy. This type of control applies the sum of a constant gain (proportional) with that of 20 db/decade gain with 90 phase lag (integral gain). This feedback loop goes unstable as the gain is more than one at a phase shift of 180°. In this case, positive feedback occurs and the control loop becomes unstable. When a mechanical body goes through a simple resonance, 90 degrees of phase shift are accumulated at the resonant peak, and there is generally an amplification of the actuator gain. (Real mechanical systems often have more complex phase behavior.) The controller gains are typically adjusted to roll off the overall system gain as the frequency approaches the actuator resonance. This strategy removes under-damped behavior in the control loop by minimizing the gain and reducing the phase lag near the fundamental resonant frequency. In practice, the feedback gains may be reduced even well below those at the limit of stability, to provide less overshoot in response to a step. In general, these steps will reduce the scanner system's usable bandwidth to a fraction of the fundamental resonant frequency. (Advanced control algorithms can mitigate the impact of these resonant frequencies.) For xy scan motion, the bandwidth of the scanner is typically limited by resonances of the xy scanner, and/or resonances in the z direction that couple to xy motion. For the z-axis, the feedback bandwidth may also be significantly limited by the cantilever response time, in addition or instead of the z-actuator resonance.

For the purposes of this application, the term "fundamental resonant frequency" is defined to be the lowest frequency at which there is a scanner resonance that has an impact on the usable bandwidth of a scanner. This definition of lowest fundamental resonant frequency specifically excludes those resonances that have no significant impact on the usable bandwidth of the scanner. These "minor resonances" may cause a variation in the system gain over a frequency range, but do not serve as a major limit for the feedback loop stability.

In a mechanical system, additional resonant behavior may exist in the frequency response at frequencies less than the fundamental resonant frequency. This resonant behavior does not affect the usable bandwidth if it is over-damped in nature due to a limited amount of associated phase lag and/or it is not of sufficient amplitude to be readily observed by the probe microscope electronics. The typical signature of a fundamental resonant frequency that does limit the bandwidth of a scanner is that there is a 90° or more phase shift at the resonance peak that is observed by the probe microscope system electronics. To be observed, a resonance must is one which generates an under-damped response of sufficient magnitude to be detectable by an actuator position sensor such as one of the sensors 128 discussed below and/or the detector 30 and their associated electronics. The reason for this caveat in the definition of fundamental resonant frequency is that it is possible to construct a tip scanner that has a component (for example, a cantilever spring clip) with a resonant frequency that is very low and yet does not affect the scanner performance.

Figure 15A:
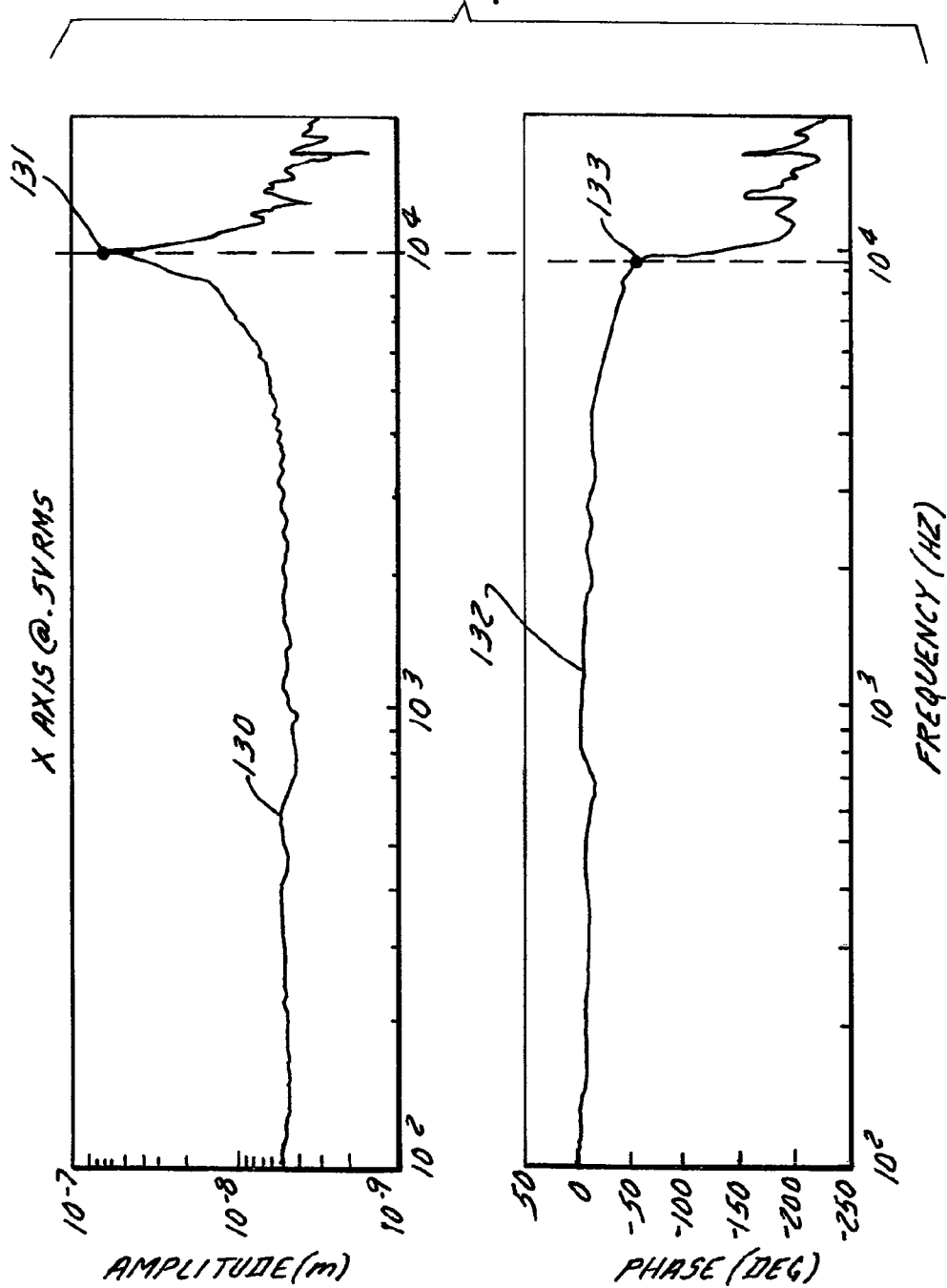
FIGS. 15A and 15B are Bode plots illustrating the response of the scanner of FIGS. 1-9 in the x and z directions, respectively.
Figure 15B:
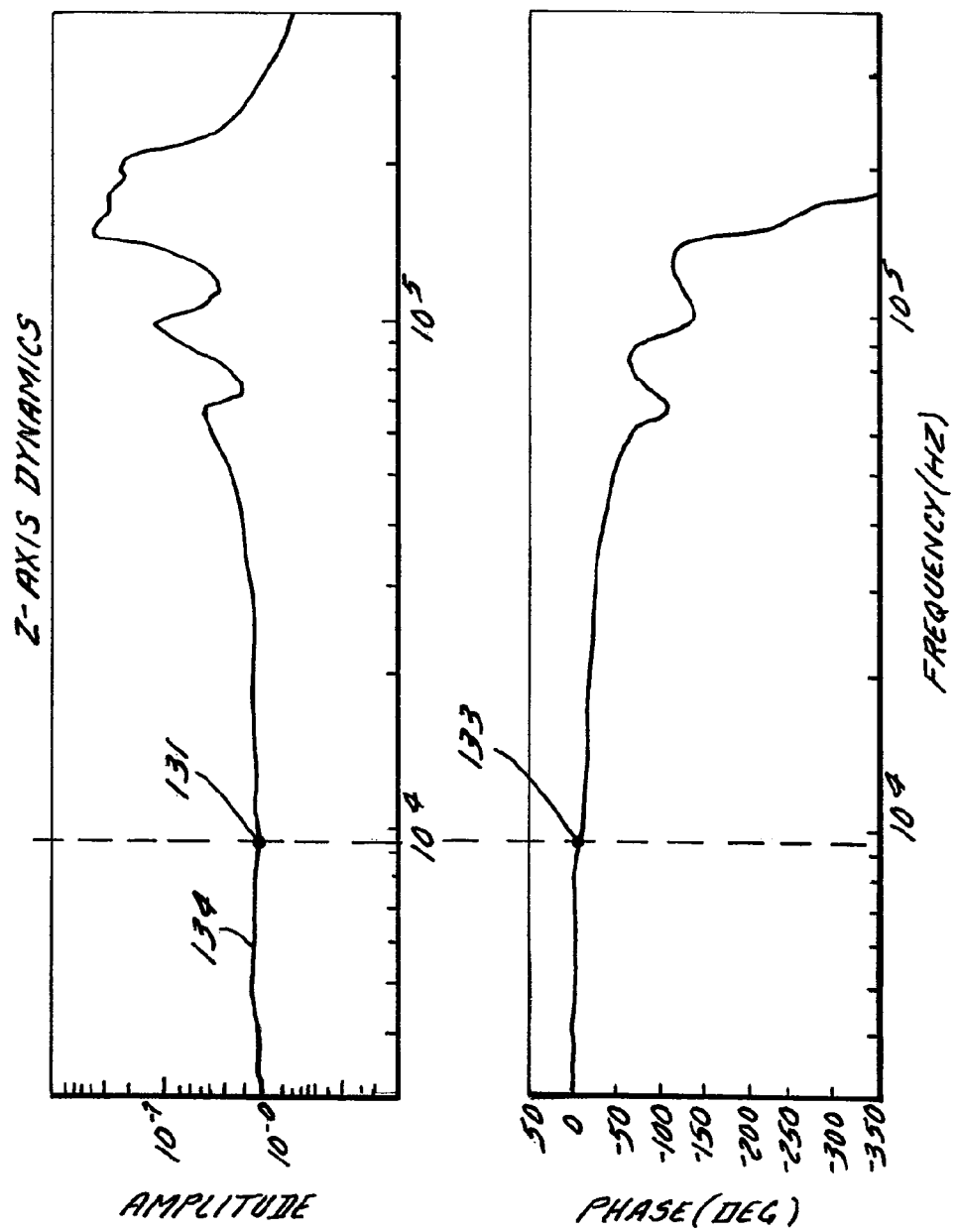

By the definition above, the fundamental resonant frequency of the tip scanner assembly of the preferred embodiment is about 9.4 kHz. The lowest resonant mode is a vertical or z-axis "drumhead" mode where the objective oscillates up and down relative to the x-y plane of the scanner. The actual fundamental resonant frequencies of this system are shown by the transfer function elements or "Bode Plots" 130, 132, 134 and 136 of FIGS. 15A and 15B. FIG. 15A illustrate the response in the x direction to driving the x actuators 116. The response in the y direction to driving the y actuators 118 is essentially the same (not shown). The 9.4 kHz resonant frequency, denoted by the peak 131 amplitude curve 130 and the phase transition 133 in phase curve 132 in FIG. 15A, is a result of the drumhead mode described above that gets excited by and coupled to x- or y-axis scanning motion. This frequency, however, does not get excited in the z direction by the z-actuator 26, as shown in FIG. 15B. No significant resonance occurs at 9.4 kHz in the z-axis, as seen at points 131 and 133 in the z-axis amplitude and phase curves, 134 and 136 in FIG. 15B.

To keep this resonance high, for a given scanner mass, the fundamental resonant frequency can be increased by making flexures 122 and 124 that are very stiff against vertical bending and torsional rotation. Flexures 126 are made extremely stiff against vertical bending. The net effect of these optimizations is to make the vertical stiffness of the tip scanner very high. In the preferred embodiment, the vertical stiffness of the tip scanner is designed to be about $10^8$ N/m. An approximation of the fundamental resonant frequency is given by:

$$F_o = \frac{1}{2 \cdot \pi} \cdot \sqrt{\frac{K_{scanner}}{M_{eff}}} \qquad \text{Equation 1}$$

Where:
$F_O$=the fundamental resonant frequency of the scanner;
$K_{scanner}$=the stiffness of the scanner, and
$M_{eff}$ is the effective mass of the scanner, which is the mass of all objects that move with the scanner.

The effective mass of the scanner of this specific embodiment is about 35 grams. Using the formula above would predict a lowest frequency of the order of 8 kHz. In practice, the resonant frequency calculation is more complex for distributed mass and spring systems such as the described scanner. As such, the described scanner was designed and optimized using a combination of analytical calculations in Matlab computing software by The Math Works in combination with finite element analysis. Using finite element analysis and measurements of the tip scanner prototype, the inventors achieved lowest vertical resonant frequencies in excess of 9 kHz, when loaded with the objective.

The torsional and bending stiffness of the flexure elements depends on the length, height, and thickness of the flexure elements. These relationships are well-known or at least readily available to those skilled in the art. For instance, they are available from various engineering texts or by finite element analysis or by physical measurement. In general terms, it is desirable to make the length as short as practical and the height and thickness as large as practical. The practical limit to this optimization is when the bending stiffness in the desired direction of motion becomes so high that it resists the motion of the actuators.

In practice, the flexure elements 122, 124 and 126 have been designed to be so stiff that they reduce the range of motion of actuators 116 and 118, as shown in the equation below.

The maximum actuator displacement, $\Delta X$, is given by:

$$\Delta X = X_o \cdot \left( \frac{K_{act}}{K_{act} + K_{flex}} \right) \qquad \text{Equation 2}$$

Where:
$X_O$ is the free range with no flexure,
$K_{act}$ is the actuator stiffness, and
$K_{flex}$ is the flexure stiffness. The price of using a high stiffnesses $K_{flex}$ is a reduction of the available actuator range $\Delta X$.

To achieve high resonant frequencies of the assembled scanner system, the flexures 122, 124, 126 are designed to have a stiffness in the direction of motion of 10-30% of the stiffness of actuators 116 and 118. This allows an acceptable trade-off of the scan range of the actuators to ensure that the combined system has a high lowest fundamental resonant frequency. In one embodiment, for example, a sacrifice of roughly 20% of the 22 μm range of the free actuator range achieves a stiffness sufficient for a resonant frequency of around 9.4 kHz while still achieving a scan size of 18 μm.

In a preferred embodiment, the actuators 116 and 118 are combinations of sets of two 5 mm×5 mm×13.5 mm piezo stacks and two 5 mm×5 mm×9 mm stacks, respectively. The combined stiffness of the actuator sets roughly $5\times10^7$ N/m in both the x and y directions. The total flexure stiffness was chosen to be around $1\times10^7$ N/m, or 20% of the actuator stiffness. This large bending stiffness of the flexures also gives a slight increase (~10%) over the actuator stiffness.

Additionally, the flexure materials and thicknesses have been chosen to ensure that the maximum stress in the flexures is well below yield stresses for those materials. In one embodiment, the scanner stage 110 is constructed from an 7076-T6 aluminum alloy, and design stresses were kept below 10 kpsi, or under 14% of the yield stress. Alternative embodiments could also be constructed from invar (for superior thermal expansion performance) or titanium, for example.

It can be seen that the second or innermost flexures 124 form a generally square frame. The barrel 88 is mounted to this frame by four sets of flexures 126, each of which extends perpendicularly from a respective portion of the barrel 88 to respective one of the innermost flexures 124. Due the arrangement of the piezoelectric elements 116, 118 and the flexures 122, 124, and 126, actuation of the x or y actuator 116 or 118 drives the barrel 88 to move in the x or y direction within the x-y plane with virtually no movement in the other direction within that plane or in the z direction.

Figure 7A:
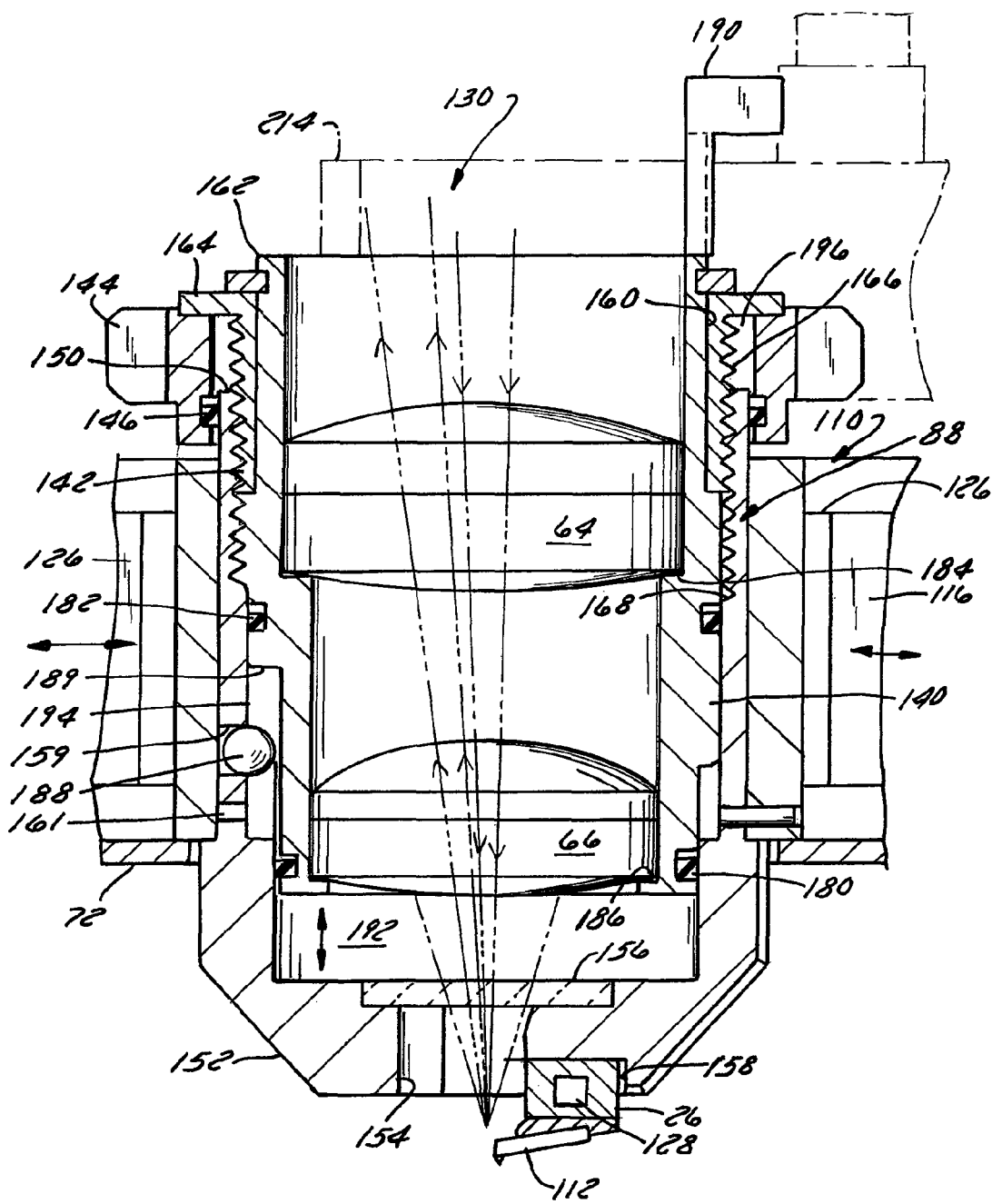
FIG. 7A is a sectional elevation view of the objective of the scan of FIGS. 3A-4, showing the objective in a first operational position thereof.
Figure 7B:
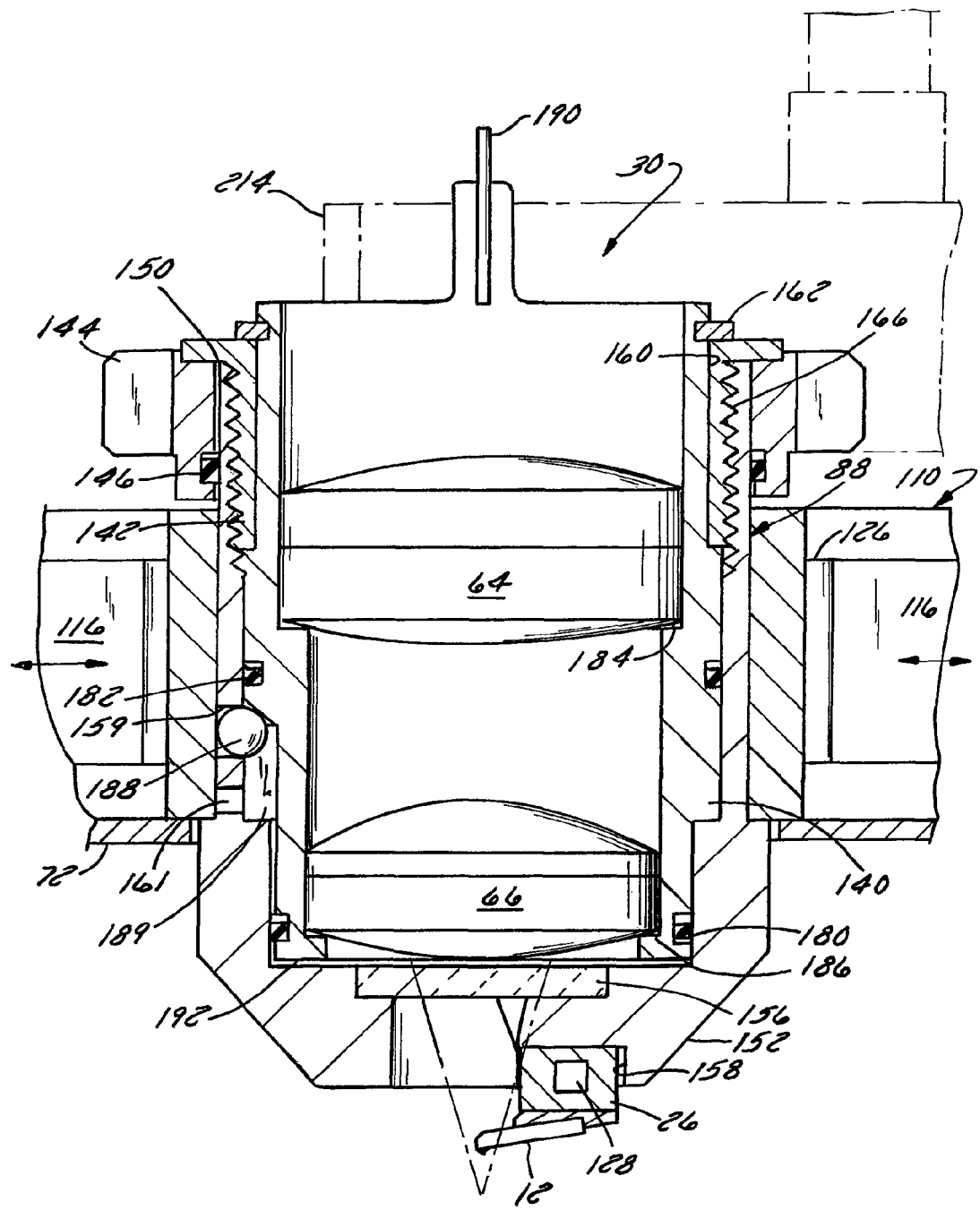
FIG. 7B corresponds to FIG. 7A and shows the objective in a second operational position thereof.

Referring to FIGS. 6, 7A and 7B, the scanner may optionally be outfitted with position sensors 128 for the x-y actuator 24 and/or the z-actuator 26 to provide feedback for maintaining actuator linearity and/or compensate for creep and drift. Capacitance, optical, strain gauge, or inductance sensors or any other sensor that produces an output indicative of actuator movement and/or position could be used. Any sensor that contacts the actuator should have minimal mass. For instance, small strain gauges 128 may be mounted on the z-actuator 26 in a Wheatstone bridge configuration. Similar strain gauges 128 may be mounted on the x and y piezoelectric elements 116 and 118 or, on the frame formed by the flexures 126.

Turning now to FIGS. 7A and 7B, the objective 34 includes the barrel 88, a lens support 140, and a sleeve 142 located radially between the lens support 140 and the barrel 88. A gear 144 is rotatably mounted on the outer surface of the upper end of the barrel 88. It is restrained from radial motion relative to the barrel 88 by an o-ring 146. The barrel 88, sleeve 142, and lens support 140 will now be described in turn.

The barrel 88 is a relatively rigid, preferably metal, structure affixed to the x-y actuator 24 as described above. It takes the form of a hollow cylinder that is open at its top end 150 and is enclosed at its bottom end 152. It is also stepped at its bottom end. A central aperture 154, covered by a transparent window 156, is formed in the bottom end 152 to permit light to pass between the objective 34 and the probe 12. The aperture 154 is also counter-bored at its bottommost end to form a mounting location 158 for the z actuator 26 and the probe 12. A socket 159 is formed in the outer wall near the bottom end of the barrel 88, and a vent passage 161 is located beneath the socket 159.

The sleeve 142 comprises an annular metal ring located in a recess 160 in the outer periphery of the lens support 140. The sleeve 142 is retained in the recess 160 by a ring 162 at its upper end and by the bottom of the recess 160 at its lower end. This mounting prohibits the sleeve 142 from moving axially relative to the lens support 140 but permits free rotational movement there between. An annular shoulder 164 extends radially from the upper end of the sleeve 142 and is affixed to the gear 144 so that the gear 144 and sleeve 142 rotate as a unit. The outer periphery of the sleeve 142 beneath the shoulder 162 is threaded at 166 and mates with an internally threaded portion 168 of the inner surface of the barrel 88. The mating threads cause the sleeve 142 to screw into and out of the barrel 88 upon rotation of the gear 144 and sleeve 142.

The lens support 140 comprises a cylindrical tube having a maximum OD that closely matches the minimum ID of the barrel 88 so as to permit sliding movement of the lens support 140 within the barrel 88 with minimum "play" or side-to-side motion therebetween. The lower end of the lens support 140 is stepped to match the step in the barrel 88. First and second O-rings 180, 182 are mounted in the OD of the lens support 140 at its bottom and central portions, respectively, so as to virtually eliminate play between the lens support 140 and the barrel 88. The inner peripheral surface of the lens support 140 is stepped at two locations 184 and 186 to provide mounting locations for the first and second lens assemblies 64 and 66, described above. A ball 188, mounted in the socket 159, engages a groove 189 formed in the outer surface of the lens support 140 so as to prevent rotational movement of the lens support 140 relative to the barrel 88 while permitting longitudinal vertical movement therebetween. A flag 190 is mounted on the upper surface of the lens support 140 for engagement with a limit switch or a similar mechanical, electrical, or optical sensor when the lens support 140 reaches its uppermost or lowest limit of travel.

A bottom chamber 192 is formed between the bottom of the lens support 140 and the inner surface of the bottom portion of the barrel 88, and an annular chamber 194 is formed between the lower portion of the outer periphery of the lens support 140 and the inner periphery of the barrel 88 at a location above the step in the barrel. Another annular chamber 196 is formed between the ID of the gear 144 and the OD of the sleeve 142 above the upper end of the barrel 88. All three chambers 192, 194, and 196 increase in size as the lens support 140 moves upwardly within the barrel 88 and decrease in size as the lens support 140 moves downwardly within the barrel 88. Preferably, measures are taken to vent air from the chambers 192, 194, and 196 during downward movement of the lens support 140. In the current embodiment, air from the bottom chamber 192 can vent into the annular chamber 194 by flowing past the O-ring 180, and air from both chambers 192 and 194 can be vented from the barrel 88 by passing through the vent passage 161. Air from the upper chamber 196 is vented by flowing between the gear 144 the outer surface of the barrel 88 and past the O-ring 146.

In use, when the gear 144 is driven to rotate by the drive 38 in FIG. 1, the sleeve 142 is driven to rotate relative to both the lens support 140 and the barrel 88. This rotation causes the sleeve 142 to screw into or out of the barrel 88, driving the lens support 140 to move upwardly or downwardly relative to the barrel 88. The ball 188 prevents the lens support 140 from rotating. Air trapped in the chambers 192, 194, and 196 during downward movement of the lens support 140 vents as described above. The range of motion that is available may vary with operator preference and system requirements. Ideally, it should be long enough to focus on the cantilever and to also focus on the sample for inspection purposes when the probe 12 is located well above the sample surface. This requires a focus depth of on the order of 1 mm. In the illustrated embodiment, this focus depth is achieved by providing the lens support 140 with a stroke of at least 1 mm, preferably of 2 mm or more, and most preferably about 3 mm, with respect to the barrel 88.

Figure 8:
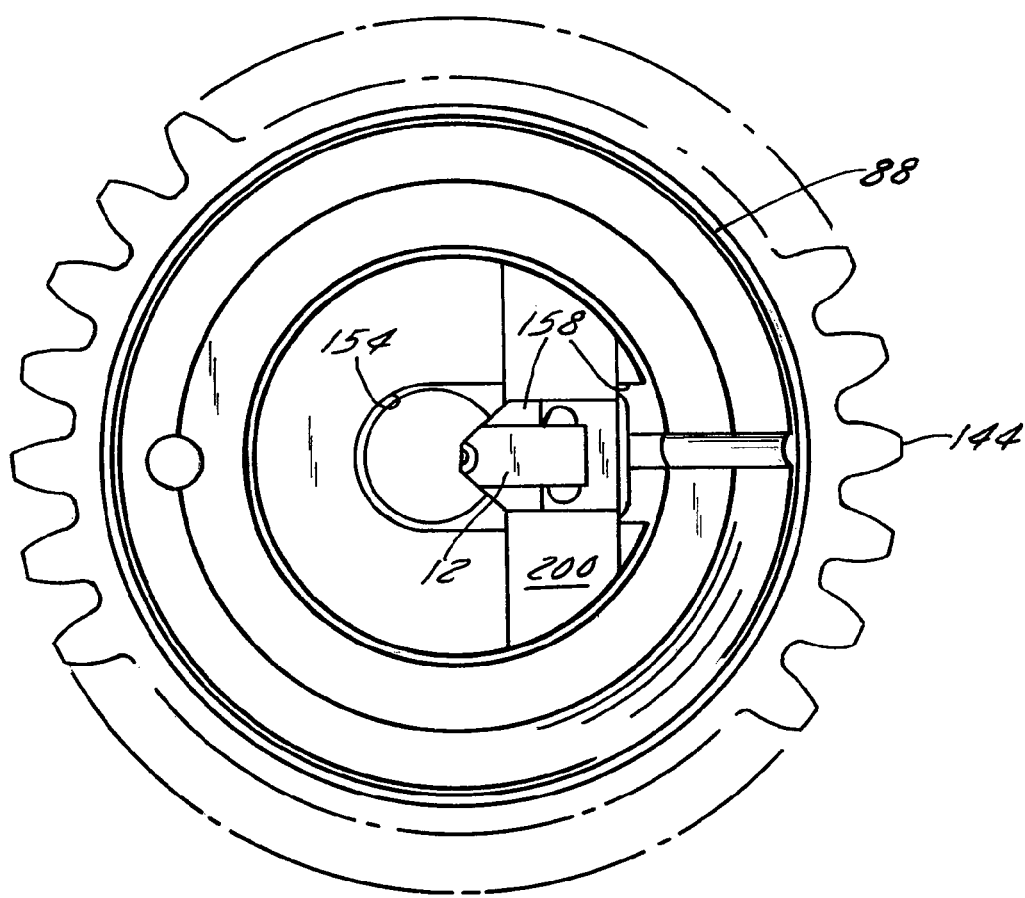
FIG. 8 is a bottom plan view of the objective of FIGS. 7A and 7B.

Referring now to FIG. 8, the probe 12 and z-actuator 26 are mounted on the bottom of the barrel 88 by a flexure 200 extending across the mounting location 158. This flexure 200 prevents any movement of the z-actuator 26 in the x-y plane during operation of the z-actuator 26.

Figure 5:
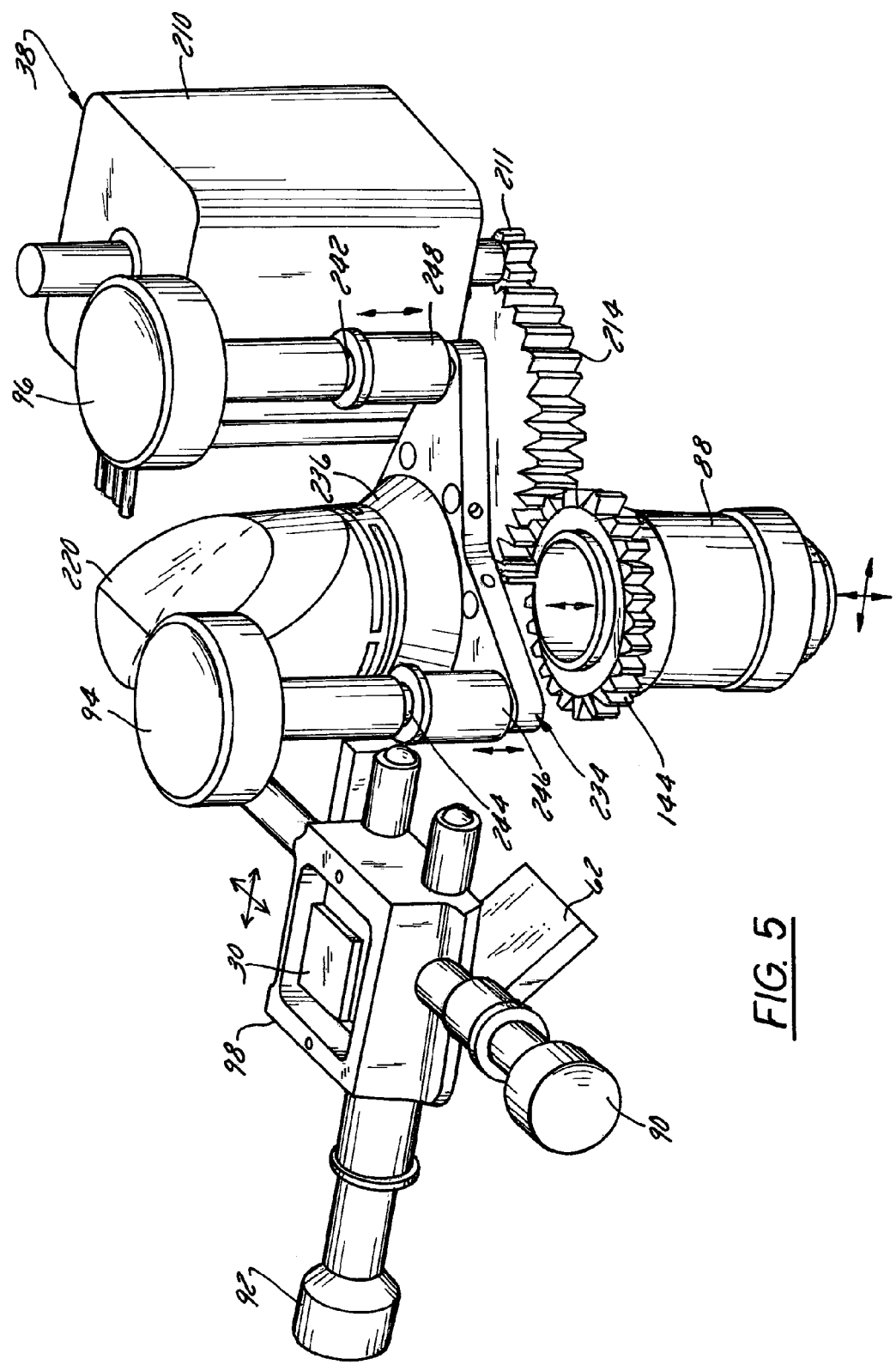
FIG. 5 is a perspective view of the operational elements of the scan head of FIGS. 3A and 3B.

The drive 38 of FIG. 1 may comprise any device, assembly, or system that can be used to drive the gear 144 to rotate through a precisely controllable angular range of motion. It is also preferably one that does not in any way constrain the lens support 140 from vertical motion or that interferes with the operation or reduces the range of operation of the x-y actuator 24. A manually operated knob could be used for this purpose. A powered motor is preferred. Referring to FIGS. 4 and 5, the presently-preferred drive comprises a stepper motor 210 mounted in the scan head 11. The stepper motor 210 has an output gear 212 coupled to the drive gear 144 for the objective by an idler gear 214. In the preferred embodiment, the stepper motor, gear train, and thread pitch are selected to achieve a precision of less than 1 μm of lens support vertical motion per motor step. The idler gear 214 and drive gear 144 have more than ample backlash to permit the range of motion provided by operation of the x-y actuator 24 and, accordingly, impose no constraints on operation of the x-y actuator 24.

In use, the sensing light beam emitted by the light source 26 is collimated by the collimator 50, shaped by the aperture 52, and then deflected to the objective 34 by the filter 54 as seen in FIG. 2. The light is then focused onto the cantilever 16 by the objective 34 and is reflected back through the objective 34 to the filter 54. However, because the outgoing sensing light beam is traveling along a subtly different path than the incoming light beam due to the effect of its deflection from the inclined cantilever 16, the outgoing beam impinges on the first prism surface 58 after being deflected by the filter 54 rather than being directed back toward the aperture 52. It is then deflected to the receiver 30 by the second prism surface 60 and the mirror 62. The resultant data, or information derived from it, may be viewed, stored, and/or transmitted to a different location.

At the same time, the illumination beam from the camera 36 enters through the front window 86, is deflected off the upper mirror 220, and travels to the objective 34, which focuses the illumination beam onto an object, typically either the cantilever 16 or the underlying sample surface. The reflected light illumination beam thereafter returns through the objective 30 and is deflected again by the mirror 220 so that it is directed back to the camera 36. The optical image, or information derived from it, may be viewed, stored, and/or transmitted to a different location.

The illumination beam mirror 220, as well as the optics including the filter 54 and the prism, are preferably movable as a unit in order to pan the instrument in the x-y plane. Because it adjusts both the sensing light beam optics and the illumination beam optics, this adjustment permits the sensing light beam focal point to be centered or "targeted" on the cantilever 16 and to be at the center of the optical microscope's field of view. The ability to both target and focus the sensing light beam permits the use of a smaller cantilever, potentially further increasing scan rates.

Figure 9:
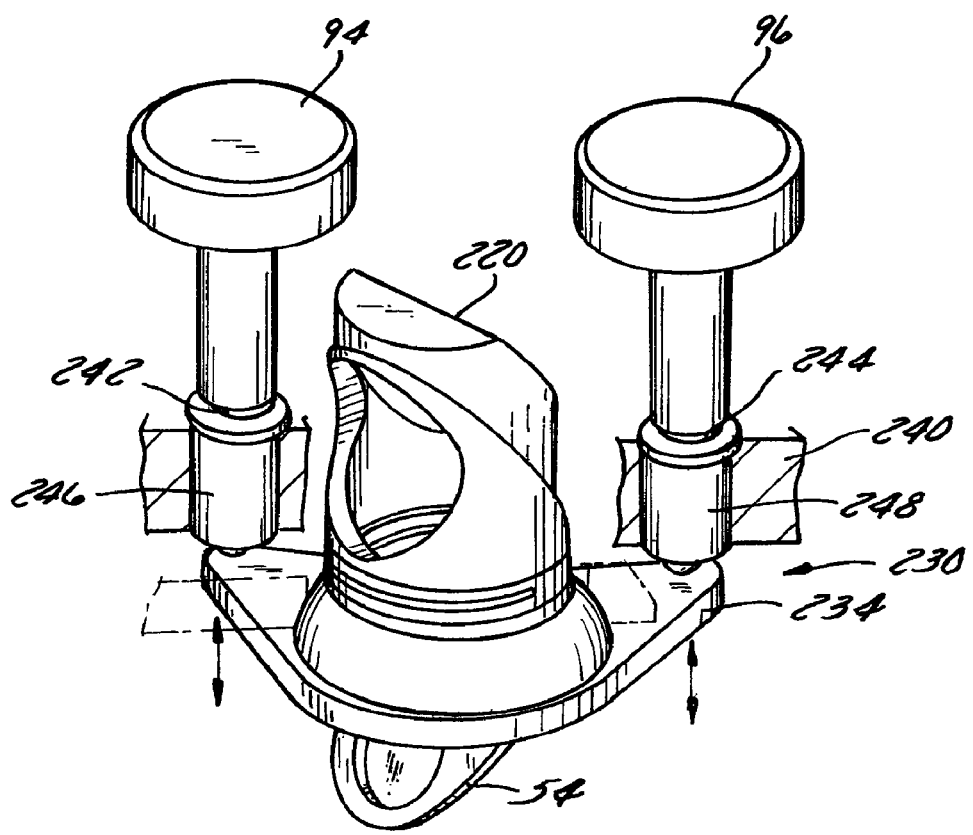
FIG. 9 is a perspective view of a tip/tilt stage of the scan head of FIGS. 3A-4.

In a preferred embodiment, this targeting is made possible by mounting the optics 28 and mirror 220 on a "tip-tilt" stage 230 seen in FIGS. 4 and 9. The tip-tilt stage 230 includes a gimbal 232 in the center of a plate 234. As best seen in FIG. 4, the gimbal 232 is formed from an annular, generally spherical surface 236 that bears against a mating socket 238 formed in a support beam 240 in the scan head 11. Referring simultaneously to FIGS. 3A, 4, and 9, first and second vertical posts 242, 244 extend vertically from the top surface of the plate 234, through the beam 240, and out of the top surface 70 of the scan head 11. Knobs 94 and 96 are mounted on the upper ends of the posts 242 and 244. The posts 242 and 244 are threaded into bushings 246 and 248 mounted in the beam 240 as seen in FIG. 9. Rotation of either of the knobs 94 or 96 screws the associated post 242 or 244 into or out of the beam 240, hence driving an associated corner of the plate 234 upwardly or downwardly. This motion results in rotation of gimbal 232 and tilting of the tip-tilt stage 230. The posts 242 and 244 are positioned such that vertical motion of the first post 242 rotates the gimbal in the y-z plane for y panning and vertical motion the second post 244 rotates the gimbal in the x-z plane for x panning.

Figure 11:
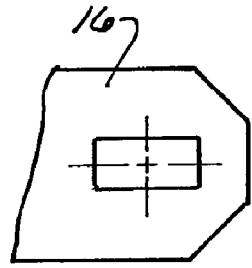
FIG. 11 is a sketch showing the targeting of a sensing light beam on a cantilever of a probe during implementation of the process of FIG. 12.

As mentioned above, this panning permits the sensing light beam to be precisely centered on the cantilever 16, preferably under visual inspection with the aid of cross-hairs or the like on a lens or monitor as seen in FIG. 11. When combined with the focusing effect of movable objective 34, a sensing light beam spot having a minor diameter of less than 20 μm can be centered on the cantilever 16. That sensing light beam spot minor diameter is preferably less than 10 μm, and most preferably less than 5 μm. Spot diameters are defined to be the width at which the amplitude of light drops to $1/e^2$ of the amplitude at the center of the spot. Provision of this small sensing light beam spot permits the use of a correspondingly small, correspondingly high resonant frequency cantilever. Cantilevers having a width of 10 μm or less and a length of 35 μm or less have a resonance frequency more than 500 KHz. This high-bandwidth cantilever, in conjunction with the use of the high-bandwidth x-y actuator assembly 24, permits faster scans than would be possible with larger cantilevers and high-mass scanners. In fact, the fundamental resonant frequency of the scanner is greater than 2 kHz, preferably greater than 5 kHz, and even more preferably greater than 9 kHz.

The operation of the instrument 10 is thus far describe will now be explained in conjunction with the flowchart of FIG. 10.

Figure 10:
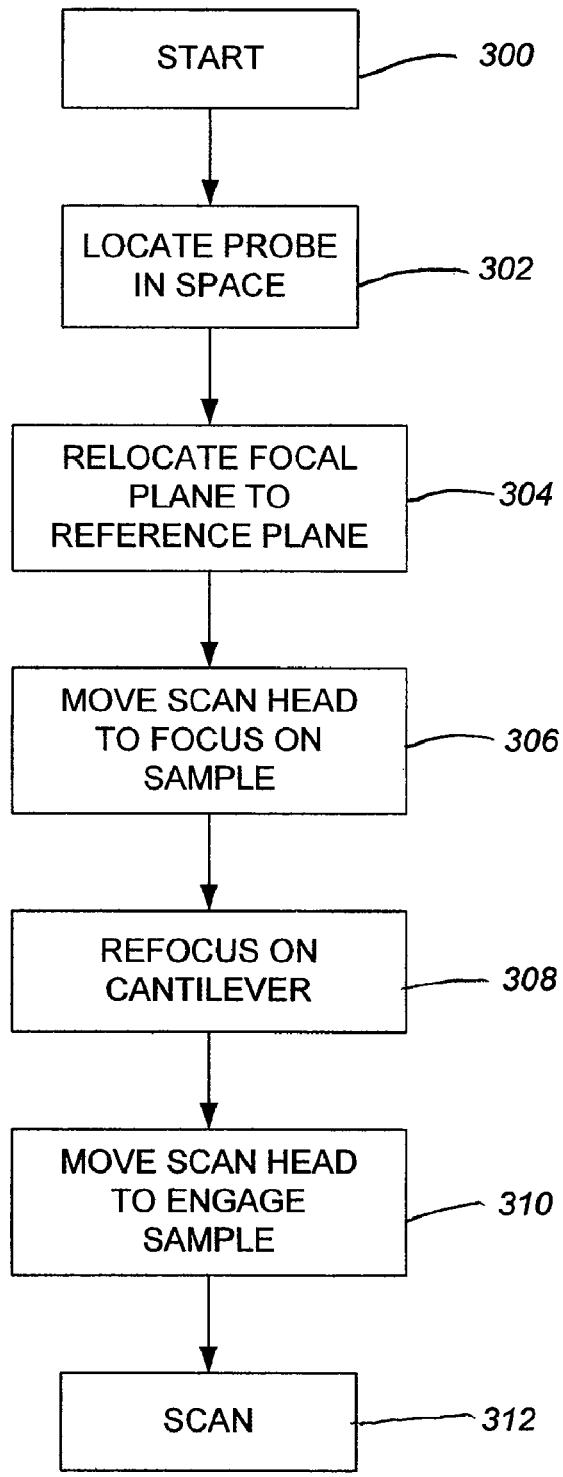
FIG. 10 is a flowchart illustrating a preferred technique for operating the AFM of FIG. 1.
Figure 12:
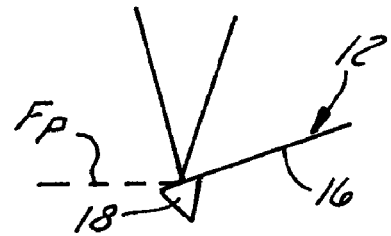
FIGS. 12-14 are sketches illustrating a process for engaging a sample during implementation of the process of FIG. 10.

The process of FIG. 10 proceeds from START in Block 300, to Block 302, where the operator locates the probe in space and centers to the sensing light beam on the cantilever 16. This will typically involve a combination of panning in x and y under visual inspection by manipulating the knobs 94 and 96 to center the sensing light beam on the cantilever 16 under visual inspection of the camera 36, which pans with the sensing light beam. It also will typically involve operating the drive 38 to focus the sensing light beam on the cantilever 16. The illumination beam will simultaneously focus on the cantilever 16 at this time, providing visual confirmation of sensing light beam centering and focusing. This focusing is shown schematically in FIG. 12.

Figure 13:
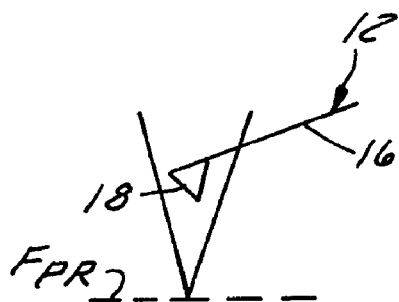
Figure 14:
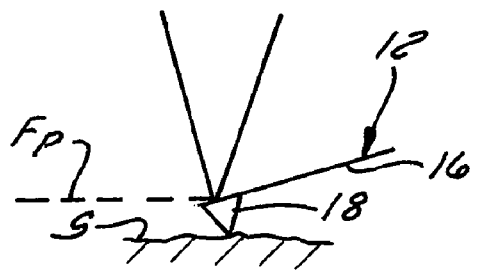

Next, in Block 304, the drive 38 is engaged to move the focal plane of the objective 34 to a specified, preferably fixed, "reference" distance below the cantilever 16, thus positioning the focal plane in a reference plane $F_{PR}$ as shown schematically in FIG. 13. The reference distance will ultimately be the initial tip/sample spacing at the start of the sample engagement process. It should be large enough to provide tolerance during sample engagement, i.e., to assure that the tip does not "crash" into the sample when it is being moved toward it. It should not be so large, however, that the obscuration of the cantilever substrate makes it difficult to view an object in the focal plane. A distance of about 1 mm is preferred. Then, in Block 306, the scan head 11 is driven downwardly under visual inspection of the optical microscope until the sample comes into focus, providing the operator with knowledge that the probe 12 is at the reference distance away from the sample surface. The process then operates the drive 38 to refocus the focal plane on the cantilever 14 as denoted by Block 308, and the scan head 11 is then moved downwardly the reference distance in Block 310 to bring the tip 18 into operative interaction with the sample. As seen in FIG. 14, both the sample surface and the cantilever will be in or very near the focal plane of both the sensing light beam and the illumination light beam at this time. If necessary or desired, the knob(s) 92 and/or 94 an be actuated to center the reflected sensing light beam on the detector 30.

Finally, in Block 312, a scan can then be performed in any desired fashion. The x-y actuator 24 may, for instance, be controlled to move the probe 12 in a raster scan. The objective 34 moves with the x-y scanner at this time and, accordingly, "tracks" movement of the probe 12. The amplitude or phase of probe oscillation is kept constant during scanning using feedback signals to control the z-actuator 26, which are generated in response to tip-sample interaction. These feedback signals are then collected, stored and/or used as data to characterize the sample. The resulting information, and/or information acquired by combining this data with other data, can be stored, transmitted to another device, and/or displayed in a suitable monitor.

Because of the small mass of the tip scanner and the high bandwidth, small probe 12, the scan can be performed very rapidly while still obtaining high-resolution images. In fact, sample features on the order of 0.5 Angstrom can be resolved while scanning along lines of 4, 5 or 10 µm or even longer at rates exceeding 50 Hz, preferably exceeding 100 Hz or 200 Hz, and even more preferably exceeding 400 Hz. These scan rates can be achieved at a force control bandwidth, i.e., a bandwidth of the force control feedback used to control the z actuator, of at least 5 kHz, and even of 10 kHz to 15 kHz or more in TappingMode operation and 30 kHz or more in contact mode operation. A sample having an RMS roughness of at least 5 µm can be scanned along scan lines of at least 4 µm with an average tracking score of at least 80% at the rates discussed above. In addition, because the tip is scanned rather than the sample, sample size is not limited. Samples having a largest dimension of more than 7 mm, more than 10 mm and even more than 100 mm can be scanned.

The process as discussed herein as well as other processes falling within the scope of the present invention could be used to scan a wide variety of samples, including but not limited to, a patterned wafer such as a semiconductor wafer, a thin film, a polymer, a biological sample, or a data storage component. Examples of data storage components include a hard disk head, a media surface, a rowbar, a slider, and a head wafer.

Other features and advantages of the invention will become apparent to those skilled in the art from the following claims.

The invention claimed is:

1. A scanning probe microscope (SPM) tip scanner comprising:
a support;
a scanner that is mounted on the support, the scanner including
a probe, and
an objective that outputs a sensing light beam that impinges on the probe, wherein the objective includes a lens that is movable vertically relative to the probe to adjust a focal point of a transmitted light beam relative to the probe; and
flexures that couple the scanner to the support;
an actuator that drives the scanner to move relative to the support in at least an x-y plane; and
a detector that is receives a light beam that is reflected from the probe, the detector being located off-board the scanner;
wherein the scanner has a fundamental resonant frequency greater than 2 kHz.

2. The tip scanner of claim 1, wherein the tip scanner has a fundamental resonant frequency of greater than 5 kHz.

3. The tip scanner of claim 1, wherein the tip scanner has a fundamental resonant frequency of greater than 9 kHz.

4. The tip scanner of claim 1, wherein the actuator includes an x-y actuator having mutually orthogonal x and y actuator elements.

5. The tip scanner of claim 4, wherein the actuator further includes a z actuator.

6. The tip scanner of claim 2, wherein the actuator further includes a z actuator that is supported on the scanned objective and that moves the probe in a z direction that is perpendicular to the x-y plane.

7. The tip scanner of claim 1, wherein the objective is movable relative to the probe.

8. The tip scanner of claim 1, further comprising an objective housing on which the probe is supported and within which the lens of the objective is vertically movable.

9. The tip scanner of claim 1, wherein the support has an aperture in which the objective is located, and wherein the flexures couple the actuator and the objective to an edge of the aperture.

10. The tip scanner of claim 9, wherein
the support comprises a scanner stage having a generally cross-shaped aperture formed therein having two sets of orthogonally arranged x and y segments, wherein
the actuator is an actuator assembly including first and second actuators located in each segment of the cross-shaped aperture, and wherein
the flexure includes first, second, and third flexures located in each segment of the cross-shaped aperture, the first actuator being positioned between the first and second actuators located in the respective segment, the second flexure being located between the first actuator and the support, and the third flexure being located between the second actuator and the objective.

11. The scanner a recited in claim 1, wherein the probe that has a resonant frequency in excess of 500 kHz, and wherein the objective outputs an illumination light beam that impinges on the probe and that has a minor spot diameter of less than 20 µm.

12. The SPM as recited in claim 11, wherein the probe has width of no more than 10 µm and a length of no more than 35 µm.

13. The SPM of claim 1, wherein the optics are movable to focus the illumination light beam on a sample surface.

14. The tip scanner of claim 1, further comprising a drive that is selectively operable to drive the objective lens to move vertically relative to the probe, the drive being located off-board the scanner.

15. The tip scanner of claim 14, wherein the drive comprises an electric motor.

16. The tip scanner of claim 14, wherein the drive has backlash therein that permits movement of the scanner in the x-y plane without interference from the drive.

17. A scanning probe microscope (SPM) tip scanner comprising:
a support;
a tip scanner including
a probe, and
a scanned objective, wherein the objective includes a lens that is movable vertically relative to the probe in order to adjust a focal point of a transmitted light beam relative to the probe;

flexures that couple the tip scanner to the support;
a detector that receives a light beam that is reflected from the probe, the detector being located off-board the scanner; and
an actuator that drives the tip scanner to move relative to the support in at least an x-y plane; wherein the tip scanner has a fundamental resonant frequency greater than 500 Hz and a sensing light beam spot minor diameter of less than 10 microns.

18. The SPM tip scanner of claim 17, wherein the tip scanner has a fundamental resonant frequency greater than 2 kHz and a sensing light beam spot minor diameter of less than 5 microns.

19. The tip scanner of claim 17, wherein the tip scanner has a fundamental resonant frequency of greater than 5 kHz.

20. The tip scanner of claim 17, wherein the tip scanner has a fundamental resonant frequency of greater than 9 kHz.

21. A scanning probe microscope (SPM) comprising:
a support;
a scanner that moves in an x-y plane relative to the support and relative to a sample during a scan operation, the scanner including
a probe, and
an objective that directs a light beam to the probe, and that directs light reflected from the probe to a detector that is located off-board the scanner, wherein the objective includes a lens that is vertically movable relative to the probe to adjust a focal point of the light beam relative to the probe;
an actuator that moves the probe in an x-y plane at a rate of at least 30 Hz;
flexures that couple the scanner to the support.

22. The SPM of claim 21, further comprising optics that direct the light beam to and from the objective, at least some of the optics being located off-board the scanner.

23. The SPM of claim 22, wherein some of the optics direct an illumination light beam and a sensing light beam to and from the probe and are movable to pan the light passing therethrough so as to direct the sensing light beam onto a desired portion of the probe.

24. The SPM of claim 23, wherein some of the optics are mounted on a tip/tilt stage that is movable in x, y, and z planes.

25. The SPM of claim 24, wherein the tip/tilt stage includes a gimbal.

26. The SPM of claim 21, wherein the support has an aperture in which the objective is located, and wherein the flexures couple the actuator and the objective to an edge of the aperture.

27. The SPM of claim 26, wherein
the support comprises a scanner stage having a generally cross-shaped aperture formed therein having two sets of orthogonally arranged x and y segments, wherein
the actuator comprises an actuator assembly including first and second actuators located in each segment of the cross-shaped aperture, and wherein
the flexures includes first, second, and third flexures located in each segment of the cross-shaped aperture, the first actuator being positioned between the first and second actuators located in the respective segment, the second flexure being located between the first actuator in the respective segment and the support, and the third flexure being located between the second actuator in the segment and the objective.

28. A method of operating a scanning probe microscope (SPM) comprising:
scanning a probe over a region of a sample at a rate of at least 30 Hz, the sample having a largest dimension of at least 7 mm, wherein the scanner includes the probe and an objective, and wherein the scanner is coupled to a support by flexures so as to be movable in at least an xy plane during the scanning;
transmitting a sensing light beam from through the objective to the robe the objective including a lens that is movable vertically relative to the probe to adjust a focal point of a transmitted light beam relative to the probe;
reflecting a light beam from the probe, through the objective, and to a detector located off-board the scanner;
generating data using signals received by the detector; and
at least one of storing, transmitting, and displaying at least one of the data and information derived from the data.

29. The method of claim 28, wherein the probe scans over a sample region having a largest diameter of at least 10 mm.

30. The method of claim 29, wherein the probe scans over a sample region having a largest diameter of at least 100 mm.

31. The method of claim 28, wherein the scanning step is performed at a rate of at least 50 Hz.

32. The method of claim 31, wherein the scanning step is performed at a rate of at least 100 Hz.

33. The method of claim 32, wherein the scanning step is performed at a rate of at least 200 Hz.

34. The method of claim 33, wherein the scanning step is performed at a rate of at least 400 Hz.

35. The method of claim 28, wherein the scanning step comprises scanning a distance of at least 5 µm.

36. The method of claim 28, wherein the scanning step comprises scanning a distance of at least 10 µm.

37. The method of claim 28, wherein the sample is one of a patterned wafer, a biological sample, a data storage device component, a polymer, and a thin film.

38. The method of claim 37, wherein the sample is a semiconductor wafer.

39. A method comprising:
manipulating optics of a scanning probe microscope (SPM) to target a focused sensing light beam on a probe of the SPM; then
manipulating the optics and a scanner of the SPM to locate a reference plane above a sample surface, the scanner including the probe and an objective and being coupled to a support by flexures;
positioning the probe in the reference plane;
manipulating the scanner to engage the sample with the probe;
moving at least a lens of the objective and the probe vertically relative to one another to adjust a focal point of a transmitted light beam relative to the probe; and
manipulating the scanner to move the objective and the probe to scan the sample with the probe while the focused sensing light beam is targeted on the probe and is reflected off the probe to a detector that is located off-board the scanner.

\* \* \* \* \*

UNITED STATES PATENT AND TRADEMARK OFFICE
CERTIFICATE OF CORRECTION

PATENT NO. : 8,166,567 B2
APPLICATION NO. : 11/687304
DATED : April 24, 2012
INVENTOR(S) : Phan et al.

Page 1 of 1

It is certified that error appears in the above-identified patent and that said Letters Patent is hereby corrected as shown below:

IN THE CLAIMS

CLAIM 2           Delete "tip"
Col. 18, Line 1

CLAIM 3           Delete "tip"
Col. 18, Line 3

CLAIM 28          Replace "robe," with --probe--.
Col. 20, Line 13

Signed and Sealed this
Fourth Day of September, 2012

David J. Kappos
*Director of the United States Patent and Trademark Office*